(12) United States Patent
Komori et al.

(10) Patent No.: US 10,585,289 B2
(45) Date of Patent: Mar. 10, 2020

(54) HEAD MOUNTED DISPLAY, AND IMAGE DISPLAYING METHOD IN HEAD MOUNTED DISPLAY

(71) Applicant: Sony Corporation, Tokyo (JP)

(72) Inventors: Akihiro Komori, Tokyo (JP); Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 13 days.

(21) Appl. No.: 16/242,963

(22) Filed: Jan. 8, 2019

(65) Prior Publication Data

US 2019/0146224 A1 May 16, 2019

Related U.S. Application Data

(63) Continuation of application No. 14/878,832, filed on Oct. 8, 2015, now Pat. No. 10,203,501, which is a continuation of application No. 14/159,246, filed on Jan. 20, 2014, now Pat. No. 9,189,829, which is a continuation of application No. 12/813,008, filed on Jun. 10, 2010.

(30) Foreign Application Priority Data

Jun. 22, 2009 (JP) ................................ 2009-147562

(51) Int. Cl.
*G06F 3/01* (2006.01)
*G02B 27/01* (2006.01)
*G06T 3/00* (2006.01)
*G06T 3/40* (2006.01)

(52) U.S. Cl.
CPC ....... *G02B 27/0172* (2013.01); *G02B 27/017* (2013.01); *G06F 3/011* (2013.01); *G06T 3/0068* (2013.01); *G06T 3/40* (2013.01); *G02B 2027/014* (2013.01); *G02B 2027/0138* (2013.01); *G02B 2027/0145* (2013.01); *G02B 2027/0178* (2013.01)

(58) Field of Classification Search
CPC .............. G02B 27/0172; G02B 27/017; G02B 2027/0145; G02B 2027/0178; G02B 2027/014; G02B 2027/0138; G06F 3/011; G06T 3/40; G06T 3/0068
See application file for complete search history.

(56) References Cited

U.S. PATENT DOCUMENTS

2002/0057280 A1* 5/2002 Anabuki .............. G02B 27/017
345/633
2007/0038944 A1* 2/2007 Carignano .............. G06T 15/20
715/757

(Continued)

*Primary Examiner* — Patrick N Edouard
*Assistant Examiner* — Joseph P Fox
(74) *Attorney, Agent, or Firm* — Sheridan Ross P.C.

(57) ABSTRACT

Disclosed herein is A head mounted display including: (A) an eyeglasses frame-like frame to be mounted to an observer's head; (B) an image display device; (C) an image sensing device mounted to the frame; and (D) a correction section, wherein the image display device includes (B-1) an image generating device, and (B-2) see-through type light guide section which is mounted to the image generating device, on which beams emitted from the image generating device are incident, through which the beams are guided, and from which the beams are emitted toward an observer's pupil.

11 Claims, 23 Drawing Sheets

EXAMPLE 1

(56) References Cited

U.S. PATENT DOCUMENTS

| | | | | |
|---|---|---|---|---|
| 2008/0123910 A1* | 5/2008 | Zhu | .................. | A61B 90/36 |
| | | | | 382/128 |
| 2010/0277489 A1* | 11/2010 | Geisner | .................. | G06F 3/011 |
| | | | | 345/581 |
| 2011/0035952 A1* | 2/2011 | Roithmeier | .......... | G01B 11/002 |
| | | | | 33/503 |

* cited by examiner

EXAMPLE 1

EXAMPLE 1

IMAGE OF OBJECT SEEN THROUGH HMD

LIGHT GUIDE PLATE

INPUT IMAGE FROM CAMERA, DISPLAYED ON SCREEN OF HMD

IMAGE OBSERVED BY OBSERVER BEFORE CORRECTION

IMAGE OF OBJECT SEEN THROUGH HMD

LIGHT GUIDE PLATE

INPUT IMAGE FROM CAMERA, DISPLAYED ON SCREEN OF HMD

IMAGE OBSERVED BY OBSERVER AFTER CORRECTION

FIG. 8

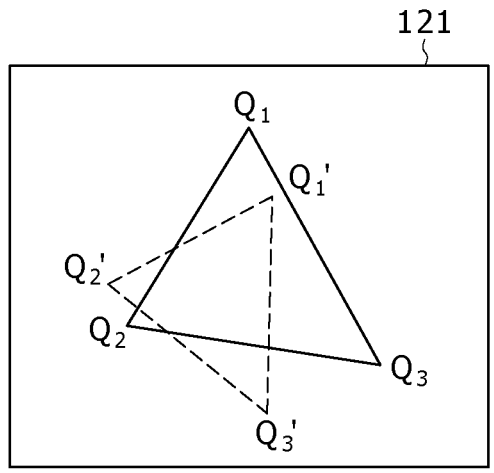

FIG. 9

• AN EXAMPLE OF GUIDANCE TO SETTING

— ADJUSTMENT OF THE SCREEN DISPLAY IS STARTED.
— A DISPLAY IN THE SCREEN AND THE OUTSIDE LANDSCAPE ARE TO BE MATCHED.
— LOOKING STRAIGHT AT A STRAIGHT PART SUCH AS WINDOW FRAME MAKES MATCHING EASY.
— PUSH THE ROTATION BUTTON FOR MATCHING THE HORIZONTAL DIRECTION.
— PUSH UP/DOWN/LEFT/RIGHT BUTTONS FOR MATCHING THE CENTER.
— PUSH SCALING BUTTON FOR MATCHING THE SIZE.
— FINISHED. DO YOU STORE THIS SETTING IN THE MAIN BODY?
— SELECT THE AREA TO STORE THE SETTING IN. (MEMORY 1, 2, 3 ...)
— STORED.

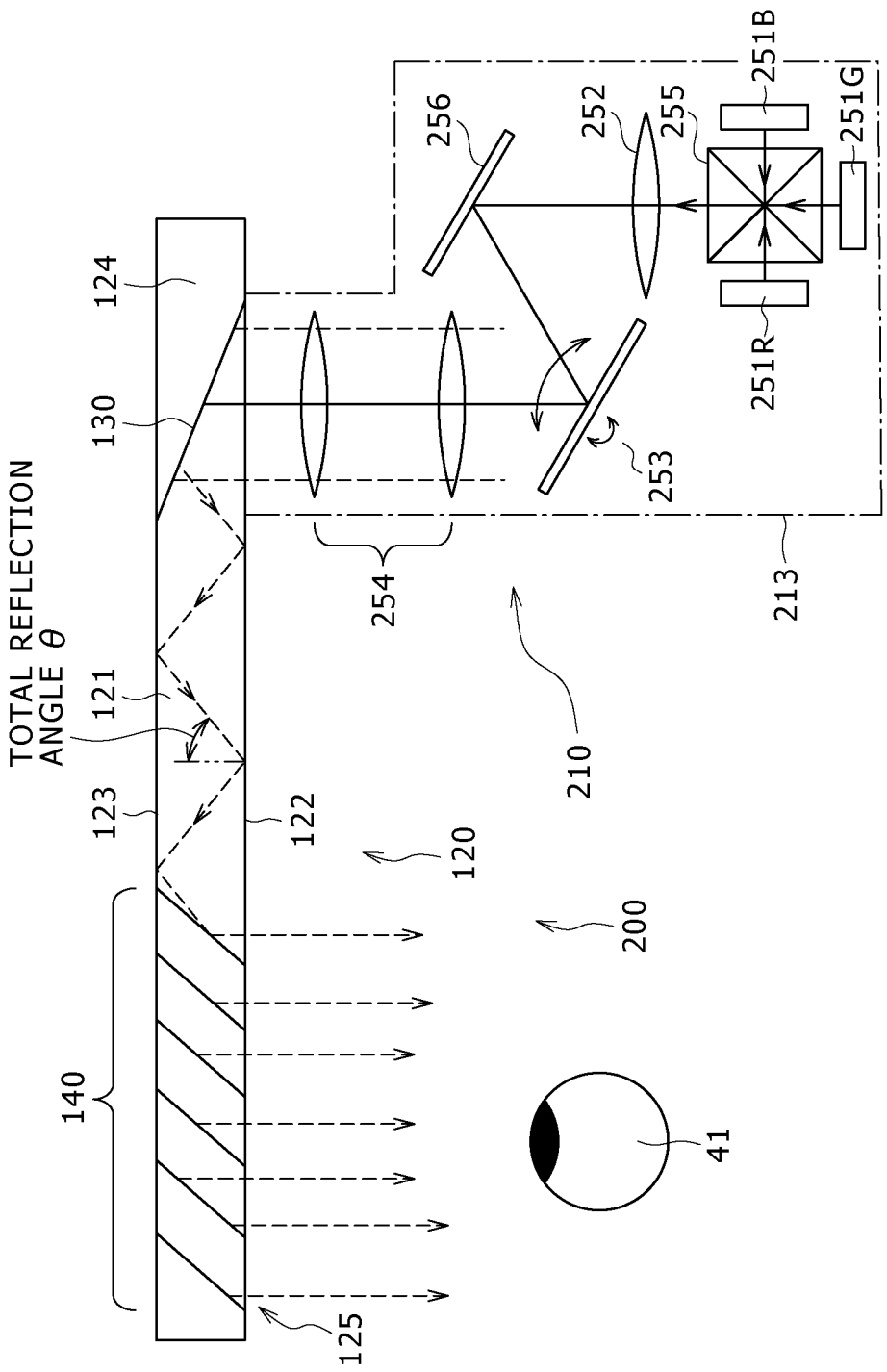

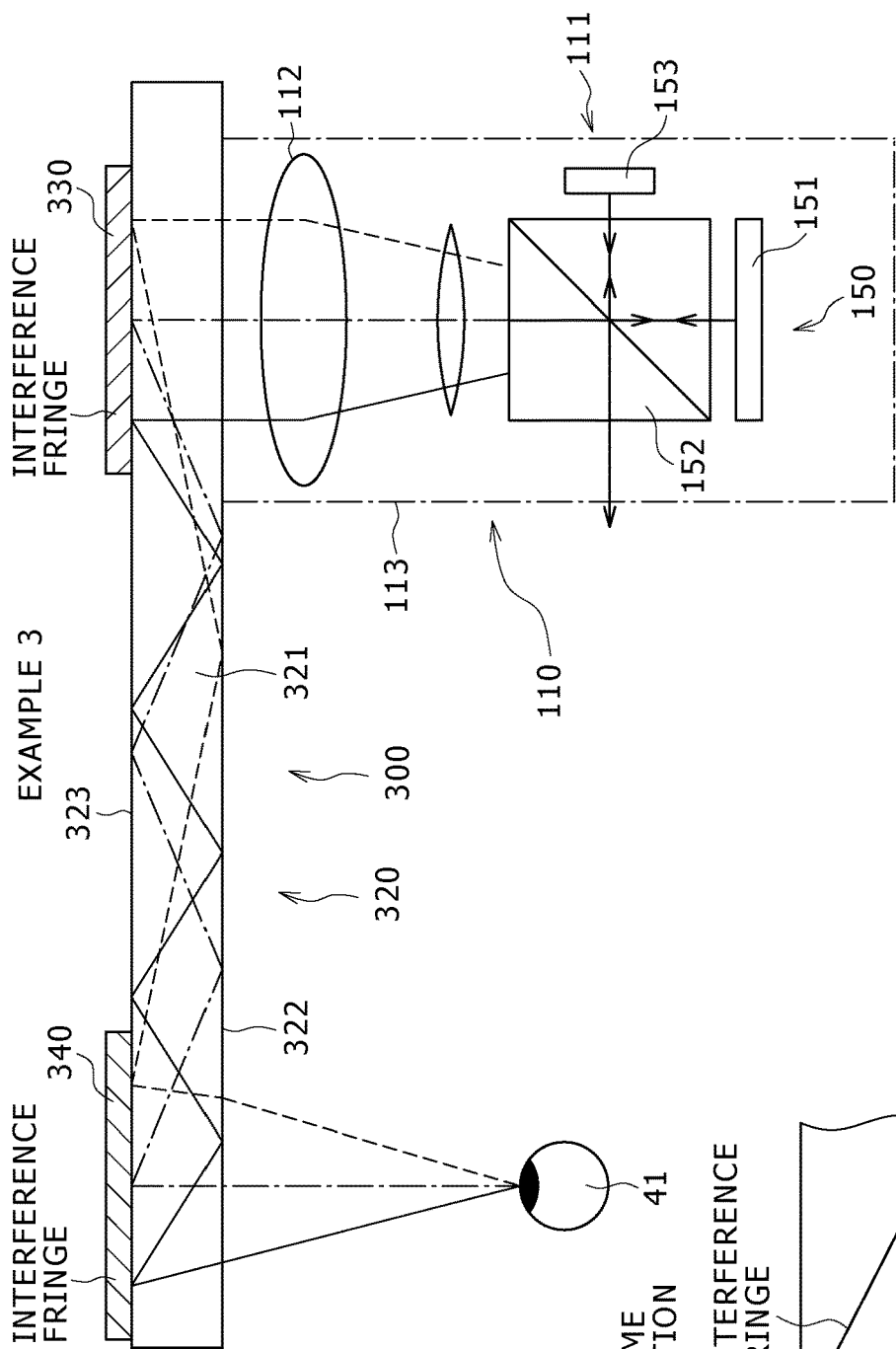
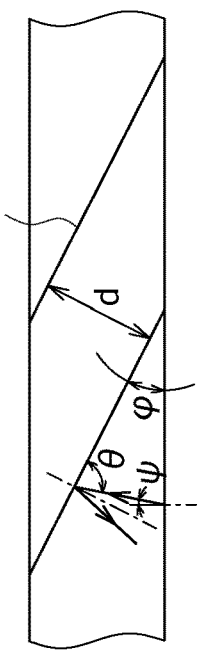
FIG.12A EXAMPLE 3
FIG.12B REFLECTION-TYPE VOLUME HOLOGRAPHIC DIFFRACTION GRATING

EXAMPLE 4

EXAMPLE 5

EXAMPLE 5

EXAMPLE 5

EXAMPLE 6

EXAMPLE 6

EXAMPLE 6

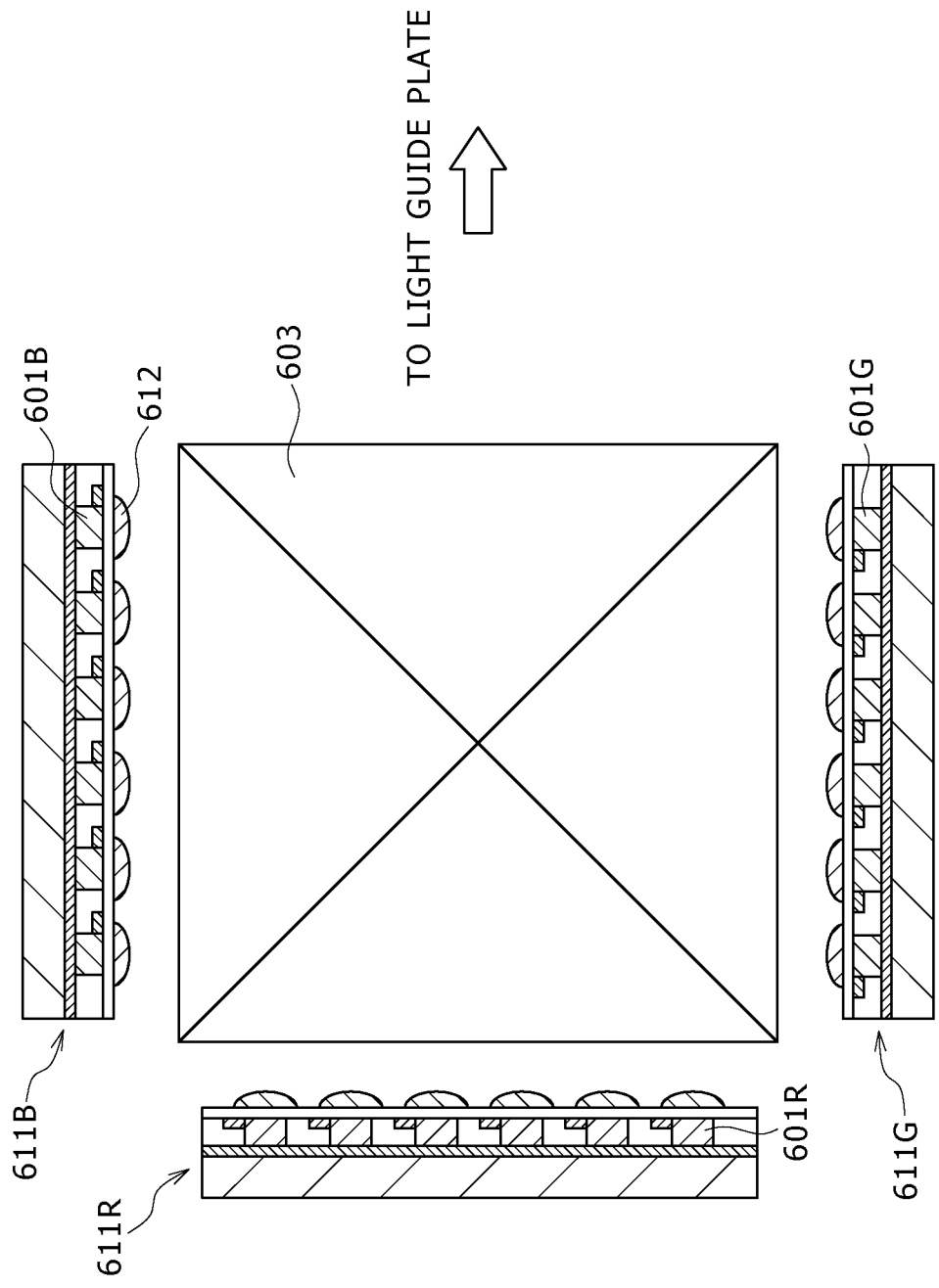

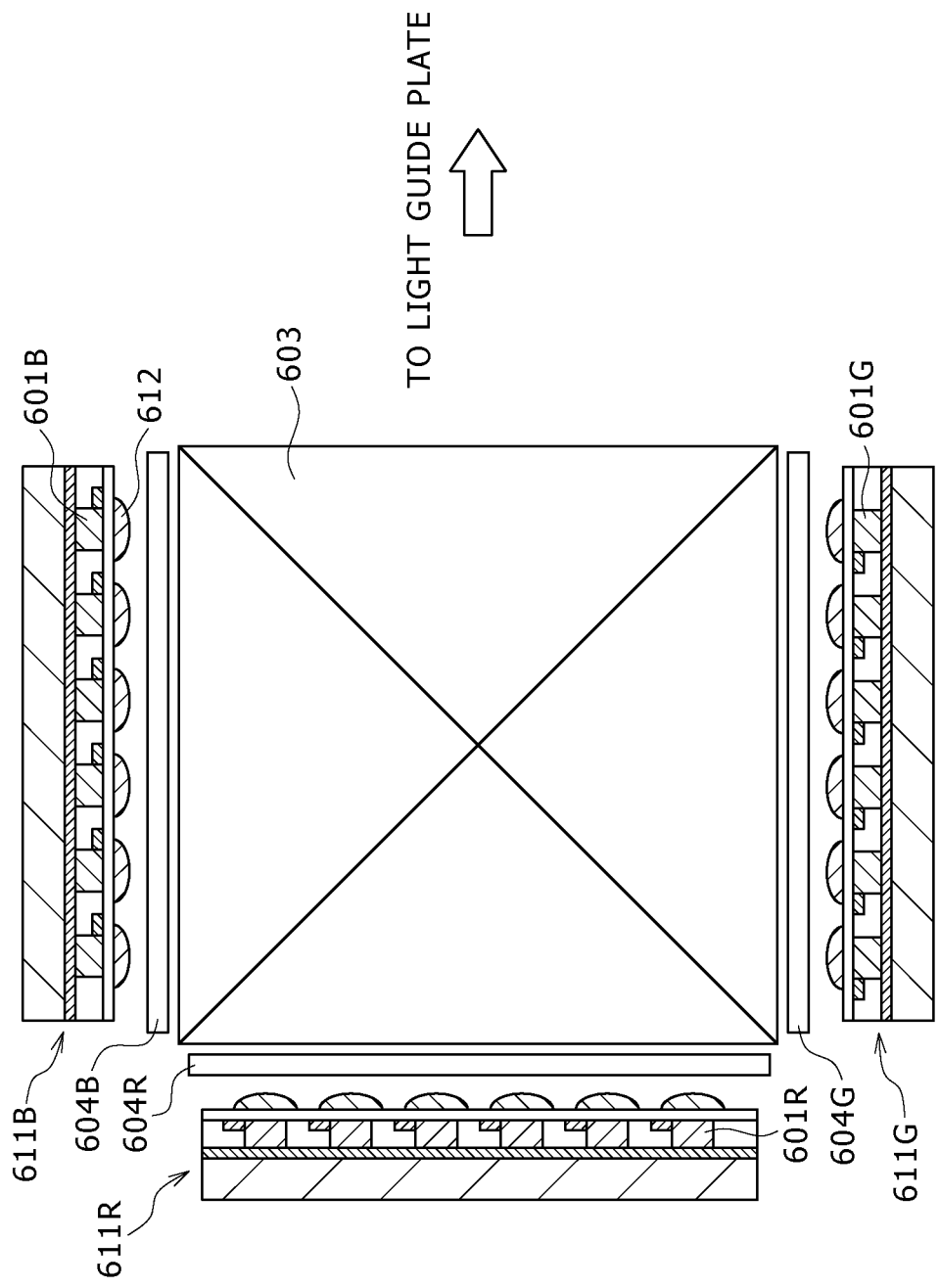

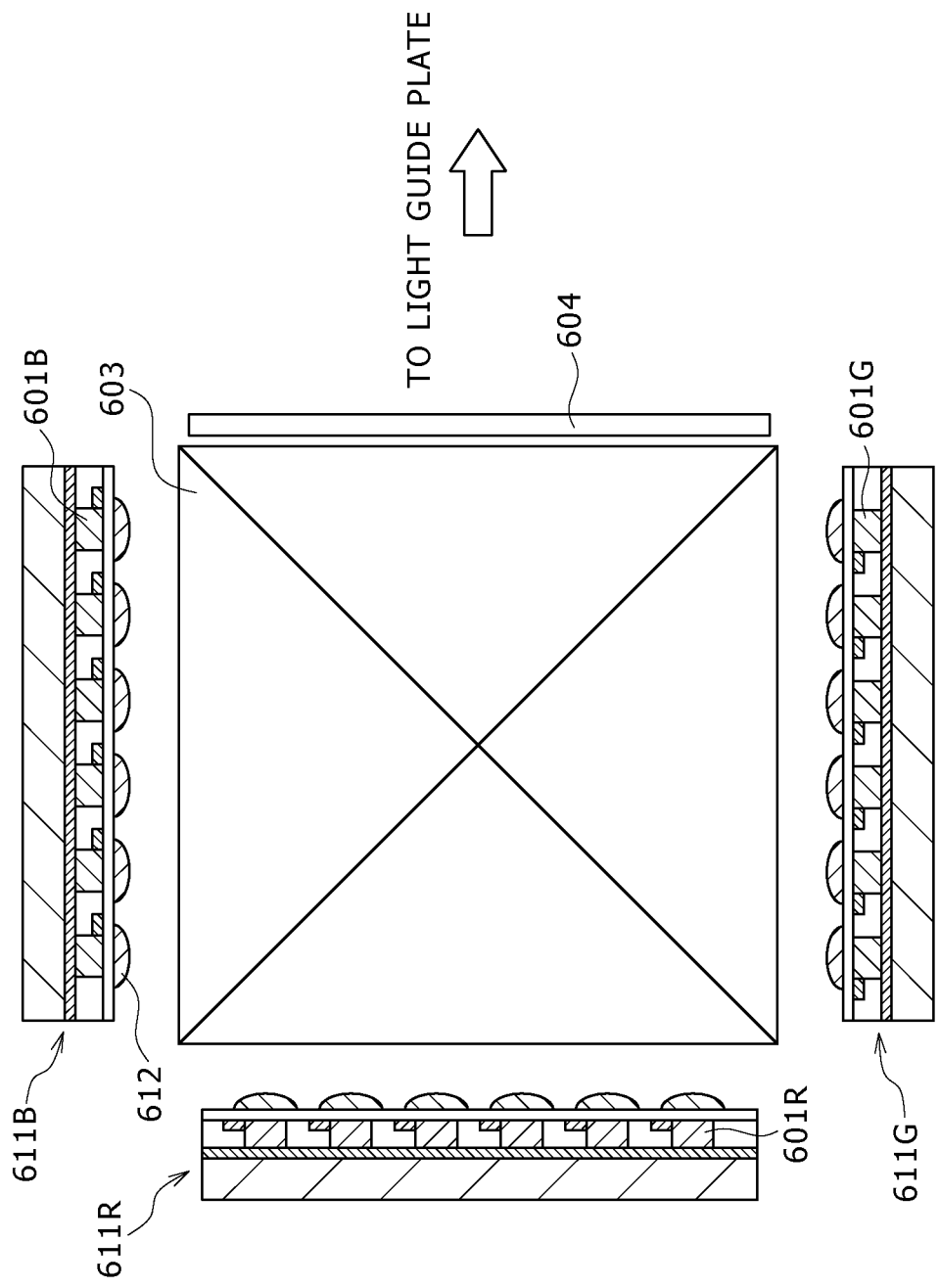

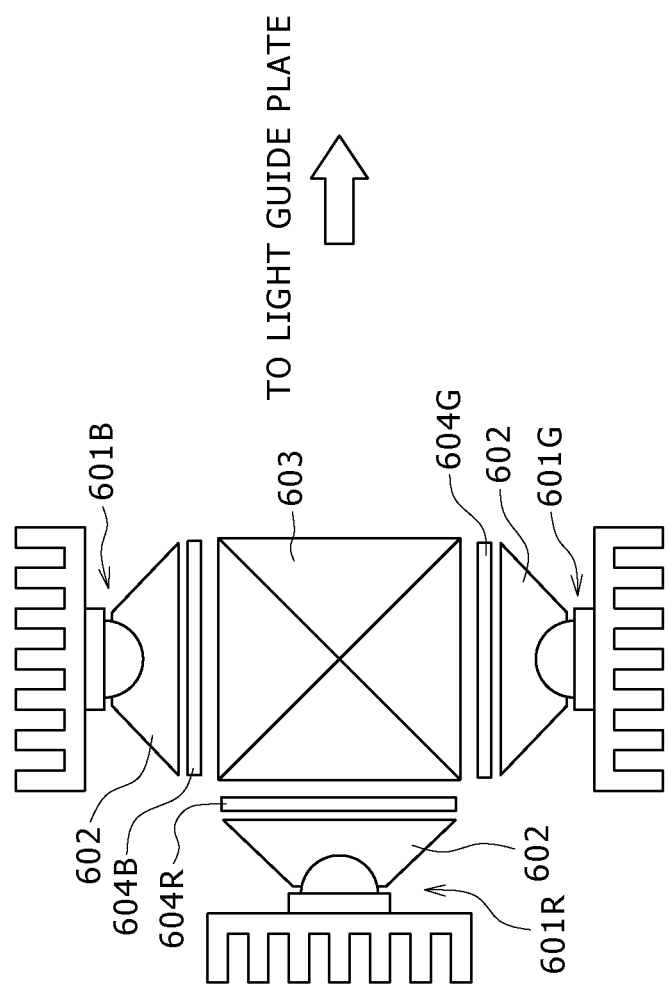

HEAD MOUNTED DISPLAY, AND IMAGE DISPLAYING METHOD IN HEAD MOUNTED DISPLAY

CROSS REFERENCES TO RELATED APPLICATIONS

This application is a continuation of U.S. patent application Ser. No. 14/878,832, filed Oct. 8, 2015, which is a continuation of U.S. patent application Ser. No. 14/159,246, filed Jan. 20, 2014, now U.S. Pat. No. 9,189,829, which is a continuation of U.S. patent application Ser. No. 12/813,008, filed Jun. 10, 2010, which claims priority to Japanese Patent Application Serial No. JP 2009-147562, filed in the Japan Patent Office on Jun. 22, 2009, the entire contents of which are hereby incorporated herein by reference.

BACKGROUND

The present invention relates to a head mounted display, and an image displaying method in a head mounted display.

A see-through type head mounted display (HMD) in which visual confirmation of an object (for example, a man, a physical body, an article, a landscape, etc.) located in the outside world by an observer (viewer, or user) is possible and an image (an image on a real basis) of the object is put into register with a virtual image (an image on a virtual basis) has been known, as for example disclosed in Japanese Patent Laid-open No. Hei 11-142784. By use of such a see-through type head mounted display (hereinafter, referred to simply as "head mounted display"), an augmented reality (AR) technology can be realized in which various kinds of data on an object can be displayed in the state of being superimposed on an image of the object. Specifically, for instance, an image of a man viewed through the head mounted display can be simultaneously picked up by an image sensing device provided in the head mounted display, and the name and/or occupation of the man can be displayed on an image display device provided in the head mounted display.

SUMMARY

Meanwhile, in realizing such an AR technology, processing of the sensed image data obtained by sensing an image of an object by the image sensing device is of importance. When the head mounted display is mounted on an observer's head, generation of changes in the spatial positional relationship between the optical axis of the image sensing device or the line of sight of the observer and the image display device, depending on the observer, seems unavoidable. When such a change is generated, however, discordance or mismatch would be generated between the information on the object (for example, data for identifying the object) which is preliminarily acquired and stored in the head mounted display and the information on the object (sensed image information) which is obtained through the operation of the image sensing device. As a result, it becomes difficult to realize the AR technology.

Thus, there is a need for a head mounted display, and an image displaying method in a head mounted display, by which the AR technology can be realized more easily and assuredly.

According to an embodiment or the head mounted display in the image displaying method according to an embodiment, there is provided a head mounted display including:

(A) an eyeglasses frame-like frame to be mounted to an observer's head;
(B) an image display device;
(C) an image sensing device mounted to the frame; and
(D) correction means, wherein the image display device includes
(B-1) an image generating device, and
(B-2) see-through type light guide means which is mounted to the image generating device, on which beams emitted from the image generating device are incident, through which the beams are guided, and from which the beams are emitted toward an observer's pupil.

In the head mounted display as above, the correction means corrects sensed image data, obtained through sensing an image of an object by the image sensing device, so that an image of the object observed through the light guide means and an image outputted from the image generating device on the basis of the sensed image data and generated in the light guide means are put into register with each other.

According to another embodiment, there is provided an image displaying method in the head mounted display (the method may hereinafter be referred to simply as "the image displaying method according to an embodiment"), wherein sensed image data obtained through sensing an image of the object by the image sensing device is corrected by the correction means so that an image observed through the light guide means and an image outputted from the image generating device on the basis of the sensed image data and generated in the light guide means are put into register with each other.

In the following description, "an image of an object observed through the light guide means" may be referred to as "a real-basis image of an object," whereas "an image outputted from the image generating device on the basis of sensed image data obtained through sensing an image of the object by the image sensing device and generated in the light guide means" may be referred to as "a generated image." Besides, while the sensed image data is corrected by the correction means so that the image, observed through the light guide means, of an object located in the outside world and the generated image in the light guide means are put into register with each other, whether or not the sensed image data is to be displayed as an image in the image display device depends on the mode of using the head mounted display.

In the head mounted display or the image displaying method according to an embodiment, the sensed image data is corrected by the correction means so that the real-basis image of an object and the generated image are put into register with each other. Therefore, even if a change is generated in the spatial positional relationship between the optical axis of the image sensing device or the line of sight of the observer and the image display device (more specifically, the light guide means) when the head mounted display is mounted on the observer's head, discordance or mismatch would not be generated between the information on the object which is preliminarily acquired and stored in the head mounted display and the information on the object which is obtained through the operation of the image sensing device, since the sensed image data is corrected as above-mentioned. Accordingly, the AR technology, which is a technology for superimposing computer-produced information on the information given to the perception from an actual environment so as to provide supplementary information, can be realized securely and easily. Specifically, additional information can be disposed on an image on an actual world basis with high positional accuracy. Moreover, it becomes possible to simplify the image correction processing for disposing the additional information with high positional accuracy. Furthermore, it becomes possible to easily set the degree of image correction according to the observer (user), and to enable a single head mounted display to be utilized in common by a plurality of users easily and comfortably.

Additional features and advantages are described herein, and will be apparent from the following Detailed Description and the figures.

BRIEF DESCRIPTION OF THE FIGURES

FIG. 8 is a diagram for illustrating the concept of the principle of correction in the head mounted display of Example 1;

FIG. 9 shows an example of character strings presented on a light guide plate through an image generating device in a correction processing in Example 1;

FIG. 11 is a conceptual diagram of an image display device in a head mounted display according to Example 2;

FIGS. 12A and 12B are respectively a conceptual diagram of an image display device in a head mounted display according to Example 3 of the invention, and a schematic sectional view showing, in an enlarged form, part of a reflection-type volume holographic diffraction grating;

FIG. 21 is a conceptual diagram illustrating another modification of the image forming device, suited to use in Example 1, 3, 5 or 6;

FIG. 22 is a conceptual diagram illustrating a further modification of the image forming device, suited to use in Example 1, 3, 5 or 6;

FIG. 23 is a conceptual diagram illustrating yet another modification of the image forming device, suited to use in Example 1, 3, 5 or 6; and FIG. 24 is a conceptual diagram illustrating a still further modification of the image forming device, suited to use in Example 1, 3, 5 or 6.

DETAILED DESCRIPTION

Figure 1:
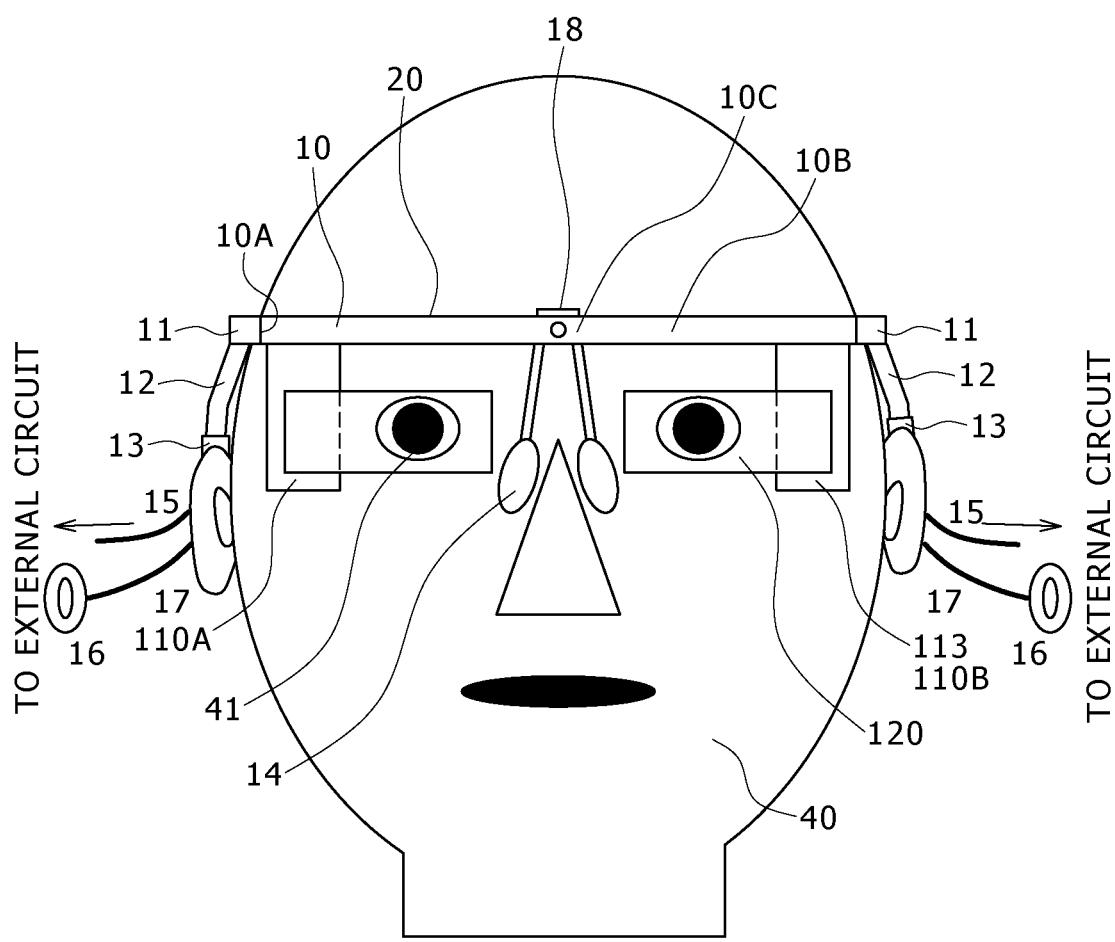
FIG. 1 is a schematic view of a head mounted display according to Example 1, as viewed from the front side.

The present application will be described below referring to the drawings according to an embodiment. However, the examples described below are not limitative, and various numerical values and materials in the following examples are shown merely as exemplary ones. Incidentally, the description will be made in the following order:

1. Head mounted display according to an embodiment and image displaying method according to an embodiment, general description 2. Example 1 (head mounted display pertaining to an embodiment and image display method pertaining to an embodiment)

3. Example 2 (a modification of the head mounted display of Example 1)

4. Example 3 (another modification of the head mounted display of Example 1)

5. Example 4 (a further modification of the head mounted display of Example 1)

6. Example 5 (yet another modification of the head mounted display of Example 1)

7. Example 6 (a still further modification of the head mounted display of Example 1, and others)

1. Head Mounted Display According to an Embodiment and Image Displaying Method According to an Embodiment, General Description In the head mounted display according to an embodiment, preferably, a correction section (correction means) stores therein correction data (expressed in terms of correction parameters, for example, in the form of matrix) obtained in calibration for correcting reference sensed image data, obtained through sensing an image of a reference object by an image sensing device, so that an image of the reference object observed through an optical device (light guide means) (this image may hereinafter be referred to as "the real-basis image of the reference object") and a reference image outputted from an image generating device on the basis of the reference sensed image data and generated in the optical device (this image may hereinafter be referred to as "the reference generated image") are put into register with each other, and the correction section is in such a form as to correct the sensed image data on the basis of the correction data so that the real-basis image of the object and the generated image are put into register with each other.

In addition, in the image displaying method according to an embodiment, preferably, the correction data (correction parameters) obtained by the calibration for correcting the reference sensed image data so that the real-basis image of the reference object and the reference generated image are put into register with each other is stored in the correction section, and the sensed image data is corrected on the basis of the correction data so that the real-basis image of the object and the generated image are put into register with each other.

Besides, in a preferred form, at the time of calibration, the correction section may enhance at least part of the contour of a reference image (reference generated image) outputted from the image generating device on the basis of the reference sensed image data, obtained through sensing an image of the reference object by the image sensing device, and generated in the optical device [head mounted display according to an embodiment of the invention], or at least part of the contour of the reference image may be enhanced by the correction section [image displaying method according to an embodiment of the invention]. Or, in the above-mentioned preferred form, at the time of the calibration, the correction section may perform a processing such that the color of the reference image (reference generated image) which is outputted from the image generating device on the basis of the reference sensed image data obtained through sensing an image of the reference object by the image sensing device and which is generated in the optical device is made to be different from the color of the reference object [head mounted display according to an embodiment], or the color of the reference image may be made to be different from the color of the reference object by the correction section [image displaying method according to an embodiment]. With these configurations adopted, the observer can easily judge whether or not the real-basis image of the reference object and the reference generated image generated in the optical device are in register with each other.

Or, in the above-mentioned preferred form, the correction data (correction parameters) may include distance reference data, which is data on the distance from the reference object to the image sensing device at the time of the calibration, and, at the time of calibrating the sensed image data so that the real-basis image of the object and the generated image are put into register with each other, the correction section may further correct the sensed image data on the basis of the data on the distance from the object to the image sensing device and the distance reference data [head mounted display according to an embodiment], or the sensed image data may be corrected by the correction section on the basis of the data on the distance from the object to the image sensing device and the distance reference data [image displaying method according to an embodiment]. By adopting such configurations, it is possible to correct the sensed image data more accurately. Incidentally, where the image sensing device is not equipped with means for measuring the distance from the object to the image sensing device, it suffices that rough data on the distance from the reference object to the image sensing device at the time of the calibration is inputted to the correction section by the observer.

Or, in the head mounted display according to an embodiment in the above-mentioned preferred form, in the calibration, the correction section may perform a processing such that the image of the reference object observed through the optical device and the reference generated image are put into register with each other, by subjecting the reference sensed image data to rotation, scaling, and transfer. Besides, in the image displaying method according to an embodiment in the above-mentioned preferred form, in the calibration, the image of the reference object observed through the optical device and the reference generated image may be put into register with each other, by subjecting the reference sensed image data to rotation, scaling, and transfer by the correction section. Specifically, it suffices to calibrate the reference sensed image data on the basis of an affine transformation matrix.

In the head mounted display according to an embodiment including the above-mentioned preferred forms and configurations, preferably, the correction section performs processings of rotation, scaling, and transfer of the sensed image data. Besides, in the image displaying method pertaining an embodiment invention including the above-mentioned preferred forms and configurations, preferably, processings of rotation, scaling, and transfer of the sensed image data are performed by the correction section. Specifically, it suffices that the sensed image data is corrected on the basis of an affine transformation matrix.

In the head mounted display according to an embodiment or the head mounted display in the image displaying method according to an embodiment including the above-mentioned preferred forms and configurations (hereinafter, these will be referred to generically as "head mounted display and the like an embodiment"), the correction section is not particularly limited; for example, the correction section may include a CPU, correction program storage means (storage device, memory), correction data storage means (storage device, memory), an input image change-over switch, an input image memory, and a VRAM (Video Random Access Memory). Here, in the image displaying method according to an embodiment including the above-mentioned preferred forms and configurations, in the calibration, an image of a motion of the observer (for example, a motion of an observer's hand) may be sensed by the image sensing device and the sensed image may be analyzed by the correction section, whereby directions to object the reference sensed image data to rotation, scaling, and transfer are given to the correction section. Incidentally, such operations can be realized by a known algorithm or software. Or, alternatively, in the calibration, processings of rotation, scaling, and transfer of the reference sensed image data may be performed by the correction section on the basis of observer's directions given by use of an operation panel. It suffices for the correction section to display on the image display device specific directions, operating methods, guidance, etc. in regard of the operations required of the observer in the calibration.

In the head mounted display and the like in the present invention, only one image display device may be provided (monocular type), or two image display devices may be provided (binocular type).

In the head mounted display and the like in the embodiment, the frame includes a front portion disposed on the front side of the observer, two temple portions turnably mounted respectively to both ends of the front portion through hinges, and end cover portions attached respectively to tip portions of the temple portions, and is accompanied further by a nose pad. The assembly of the frame and the nose pad is substantially the same in structure as an ordinary pair of eyeglasses, except for the absence of rims. The material for forming the frame may be selected from among the same materials used for forming ordinary eyeglasses, that is, from among metals, alloys, plastics, and combinations thereof.

Besides, preferably, a wiring (a signal line, a power supply line, etc.) extended from one or two image generating devices extends through the inside of the temple portion and the end cover portion and extends from a tip part of the end cover portion to the exterior to be connected to an external circuit (control circuit), from the viewpoint of better design of the head mounted display or ease of mounting of the head mounted display. Further preferably, each of the image generating devices has a headphone portion, and a headphone wiring extended from each image generating device extends through the inside of the temple portion and the end cover portion and extends from a tip portion of the end cover portion to the headphone portion. Examples of the headphone portion include an inner ear type headphone portion, and a canal type headphone portion. More specifically, the headphone wiring is preferably extended from the tip portion of the end cover portion to the headphone portion in the manner of going around on the rear side of the auricle (concha).

In the head mounted display and the like in the present embodiment, the image sensing device may be mounted to a central part of the front portion. The image sensing device, specifically, includes a solid-state image sensing element, which has a CCD (Charge Coupled Device) or a CMOS (Complementary Metal Oxide Semiconductor) sensor, and a lens or lenses. The wiring extended from the image sensing device may, for example, be passed on the rear side of the front portion to be connected to the image display device on one side, and may, further, be included in the wiring extended from the image generating device(s).

In the head mounted display or the like according to an embodiment, the optical device may each include:

(a) a light guide plate which as a whole is disposed on the side of the center of the observer's face relative to the image generating device, on which beams emitted from the image generating device are incident, through which the beams are guided, and from which the beams are emitted toward the observer's pupil;

(b) a first deflecting section by which the beams entering the light guide plate are deflected so that the beams entering the light guide plate undergo total reflections in the inside of the light guide plate; and (c) a second deflecting section by which the beams propagated through the inside of the light guide plate while undergoing total reflections are deflected a plurality of times so that the beams propagated through the inside of the light guide plate while undergoing total reflections are emitted from the light guide plate. Incidentally, the term "total reflection" means internal total reflection, or total reflection in the inside of the light guide plate. This applies in the following description as well.

Besides, in the above-mentioned form of the head mounted display and the like in the present invention, a configuration may be adopted in which the first deflecting section reflects the beams entering the light guide plate, whereas the second deflecting section transmits and reflects a plurality of times the beams propagated through the inside of the light guide plate while undergoing total reflections. In this case, further, a configuration may be adopted in which the first deflecting section functions as a reflecting mirror, while the second deflecting section functions as a semi-transparent mirror.

In such a configuration, the first deflecting section may include a light-reflective film (a kind of mirror) which is formed, for example, from a metal or alloy and which reflects the beams entering the light guide plate, or a diffraction grating (e.g., a holographic diffraction grating film) which diffracts the beams entering the light guide plate. In addition, the second deflecting section may include a multilayer laminated structure in which a multiplicity of dielectric laminated films are laminated, a half mirror, a polarization beam splitter, or a holographic diffraction grating film. The first deflecting section and the second deflecting section are disposed inside the light guide plate (incorporated in the light guide plate). At the first deflecting section, the parallel beams entering the light guide plate are reflected or diffracted so that the parallel beams entering the light guide plate undergo total reflections in the inside of the light guide plate. On the other hand, at the second deflecting section, the parallel beams propagated through the inside of the light guide plate while undergoing total reflections are reflected or diffracted a plurality of times and are emitted from the light guide plate in the state of parallel beams.

Or, alternatively, in the above-mentioned form of the head mounted display and the like in the present invention, a configuration may be adopted in which the first deflecting section diffracts the beams entering the light guide plate, and the second deflecting section diffracts a plurality of times the beams propagated through the inside of the light guide plate while undergoing total reflections. Besides, the first deflecting section and the second deflecting section may each include a diffraction grating element; in this case, further, the diffraction grating element may include a reflection-type diffraction grating element or a transmission-type diffraction grating element. Or, a configuration may be adopted in which the diffraction grating element on one side includes a reflection-type diffraction grating element, whereas the diffraction grating element on the other side includes a transmission-type diffraction grating element. Incidentally, a reflection-type volume holographic diffraction grating may be mentioned as an example of the reflection-type diffraction grating element. The first deflecting section including the reflection-type volume holographic diffraction grating may be referred to as "first diffraction grating member" for convenience, and the second deflecting section including the reflection-type volume holographic diffraction grating may be referred to as "second diffraction grating member" for convenience.

The first diffraction grating member or the second diffraction grating member may have a configuration in which, for corresponding to diffraction/reflection of P kinds of beams having different P kinds of wavelength bands (or wavelengths) (here, for example, P=3, for three kinds of colors, i.e., red, green, and blue), P layers of diffraction grating layers each including a reflection-type volume holographic diffraction grating are laminated. Incidentally, each of the diffraction grating layers is formed therein with interference fringes corresponding to one kind of wavelength band (or wavelength). Or, a configuration may be adopted in which, for corresponding to diffraction/reflection of P kinds of beams having different P kinds of wavelength bands (or wavelengths), the first diffraction grating member or second diffraction grating member including one diffraction grating layer is formed therein with P kinds of interference fringes. Or, further, a configuration may be adopted in which an angle of view is trisected, for example, and the first diffraction grating member or the second diffraction grating member has a structure in which diffraction grating layers corresponding to the angles of view are laminated. When such a configuration as above-mentioned is adopted, it is possible to contrive an enhanced diffraction efficiency, an enlarged diffraction acceptance angle, and an optimized diffraction angle, with respect to the diffraction/reflection of a beam having each wavelength band (or wavelength) at the first diffraction grating member or the second diffraction grating member.

As a material for constituting the first diffraction grating member and the second diffraction grating member, photopolymer materials may be mentioned. The constituent material and basic structure for the first diffraction grating member and the second diffraction grating member each including a reflection-type volume holographic diffraction grating may be the same as those of reflection-type volume holographic diffraction gratings according to the related art. The reflection-type volume holographic diffraction grating means a holographic diffraction grating which performs diffraction/reflection of only beams of an order of diffraction of +1 (plus one). The diffraction grating member is formed with interference fringes in its portion ranging from the inside to a surface thereof, and the method for forming the interference fringes themselves may be the same as the forming method in the related art. Specifically, a method may be adopted in which, for example, a member (e.g., photopolymer material) constituting a diffraction grating member is irradiated with an object beam from a first predetermined direction on one side, and, simultaneously, the member constituting the diffraction grating member is irradiated with a reference beam from a second predetermined direction on the other side, whereby interference fringes formed by the object beam and the reference beam are recorded in the inside of the member constituting the diffraction grating member. When the first predetermined direction, the second predetermined direction, and the wavelengths of the object beam and the reference beam are selected appropriately, it is possible to obtain a desired pitch and a desired slant angle with respect to the interference fringes on the surface of the diffraction grating member. The slant angle of interference fringes means the angle formed between the surface of the diffraction grating member (or a diffraction grating layer) and the interference fringes. In the case where the first diffraction grating member and the second diffraction grating member each have a laminated structure of P layers of diffraction grating layers each including a reflection-type volume holographic diffraction grating, the lamination of such diffraction grating layers may be performed by individually forming the P layers of diffraction grating layers and thereafter laminating (adhering) the P layers of diffraction grating layers onto each other by use of a UV-curing adhesive, for example. Or, alternatively, a method may be adopted in which one diffraction grating layer is formed by use of a tacky photopolymer material, and thereafter diffraction grating layers are formed thereon by sequentially adhering tacky photopolymer materials, whereby the P layers of diffraction grating layers are produced.

Or, in the head mounted display and the like in the present invention, the optical device may each include a semi-transparent mirror which is disposed on the side of the center of the observer's face relative to the image generating device, on which beams emitted from the image generating device are incident, and from which the beams are emitted toward the observer's pupil. Incidentally, the beam emitted from the image generating device may be propagated through the air to be incident on the semi-transparent mirror, or may be propagated through the inside of a transparent member such as, for example, a glass plate or a plastic plate (specifically, a member formed of a material similar to the material constituting the light guide plate which will be described later) to be incident on the semi-transparent mirror. Incidentally, the semi-transparent mirror may be mounted to the image generating device through the transparent member; alternatively, the semi-transparent mirror may be mounted to the image generating device through a member other than the transparent member.

In the head mounted display or the like according to an embodiment including the above-mentioned various preferable forms and configurations, the image generating device may include:

(a) an image forming device having a plurality of pixels arranged in a two-dimensional matrix; and (b) a collimating optical system by which beams emitted from the pixels of the image forming device are turned into parallel beams and the parallel beams are emitted. Incidentally, the configuration of the image generating device as just-mentioned will be referred to as "image generating device of the first configuration" for convenience.

In the image generating device of the first configuration, examples of the image forming device include: an image forming device including a reflection-type spatial light modulator and a light source; an image forming device including a transmission-type spatial light modulator and a light source; and an image forming device including light emitting elements such as organic EL (Electro Luminescence) elements, inorganic EL elements, light emitting diodes (LEDs), etc. Among these, preferred is the image forming device including a reflection-type spatial light modulator and a light source. Examples of the spatial light modulator include light valves, for example, a transmission-type or reflection-type liquid crystal display device such as LCOS (Liquid Crystal On Silicon), etc., a digital micromirror device (DMD) and so on. Examples of the light source include light emitting elements. Further, the reflection-type spatial light modulator may include a liquid crystal display device, and a polarization beam splitter by which part of the light beam from the light source is reflected and guided to the liquid crystal display device and through which part of the light beam reflected by the liquid crystal display device is passed and guided to the collimating optical system. Examples of the light emitting element for constituting the light source include a red light emitting element, a green light emitting element, a blue light emitting element, and a white light emitting element. In addition, examples of the light emitting elements include semiconductor laser elements and LEDs. The number of the pixels may be determined based on the specifications required of the head mounted display. Examples of the number of the pixels include 320×240, 432×240, 640×480, 1024×768, and 1920×1080.

Or, in the head mounted display according to another embodiment including the above-mentioned preferable forms and configurations, the image generating device may include:

(a) a light source;

(b) a collimating optical system by which beams emitted from the light source are turned into parallel beams;

(c) a scanning section configured to scan the parallel beams emitted from the collimating optical system; and (d) a relay optical system by which the parallel beams scanned by the scanning section are relayed and emitted. Incidentally, the configuration of the image generating device as just-mentioned will be referred to as "image generating device of the second configuration" for convenience.

The light source in the image generating device of the second configuration may, for example, be a light emitting element(s). Specific examples of the light emitting element(s) include a red light emitting element, a green light emitting element, a blue light emitting element, and a white light emitting element. In addition, examples of the light emitting elements include semiconductor laser elements and LEDs. The number of pixels (virtual pixels) in the image generating device of the second configuration may also be determined based on the specifications required of the head mounted display. Specific examples of the number of the pixels (virtual pixels) include 320×240, 432×240, 640×480, 1024×768, and 1920×1080. Besides, in the case where the light source is composed by using red light emitting elements, green light emitting elements and blue light emitting elements, it is preferable to perform color synthesis by use of a crossed prism, for example. Examples of the scanning section include those by which the light beams emitted from the light source are subjected to horizontal scanning and vertical scanning, for example, a MEMS (Micro Electro Mechanical Systems) having a micromirror capable of being rotated in two-dimensional directions, or a galvano-mirror. The relay optical system may include a known relay optical system.

For example, an image forming device including light emitting elements and light valves may be used. Or, a combination of a backlight operable to emit white light as a whole, as a light source, with a liquid crystal display device having red light emitting pixels, green light emitting pixels, and blue light emitting pixels may be used. In addition to these, the following configurations can also be mentioned as examples of usable configurations.

Image Forming Device A

An image forming device A includes:

(α) a first image forming device having a first light emitting panel in which first light emitting elements operable to emit blue light are arranged in a two-dimensional matrix;

(β) a second image forming device having a second light emitting panel in which second light emitting elements operable to emit green light are arranged in a two-dimensional matrix; and (γ) a third image forming device having a third light emitting panel in which third light emitting elements operable to emit red light are arranged in a two-dimensional matrix; as well as (δ) a section configured to collect the lights emitted from the first image forming device, the second image forming device and the third image forming device into a single optical path (the section is, for example, a dichroic prism, the same applying in the following description as well);

wherein the light-emitting/non-light-emitting states of the first light emitting elements, the second light emitting elements and the third light emitting elements are controlled.

Image Forming Device B

An image forming device B includes:

(α) a first image forming device including a first light emitting element operable to emit blue light, and a first light passage controller configured to control the passage/non-passage of the light emitted from the first light emitting element operable to emit blue light [the light passage controller is a kind of light valve and includes, for example, a liquid crystal display device, a digital micromirror device (DMD), or a LCOS, the same applying in the following description as well];

(β) a second image forming device including a second light emitting element operable to emit green light, and a second light passage controller (light valve) configured to control the passage/non-passage of the light emitted from the second light emitting element operable to emit green light; and (γ) a third image forming device including a third light emitting element operable to emit red light, and a third light passage controller (light valve) configured to control the passage/non-passage of the light emitted from the third light emitting element operable to emit red light; as well as (δ) a section configured to collect the lights passed through the first light passage controller, the second light passage controller and the third light passage controller into a single optical path;

wherein the passage/non-passage of the lights emitted from the light emitting elements is controlled by the light passage controllers, whereby an image is displayed. Examples of sections (light guiding members) configured to guide the lights emitted from the first light emitting element, the second light emitting element and the third light emitting element to the light passage controllers include light guide members, microlens arrays, mirrors or reflecting plates, and condenser lenses.

Image Forming Device C

An image forming device C includes:

(α) a first image forming device including a first light emitting panel in which first light emitting elements operable to emit blue light are arranged in a two-dimensional matrix, and a blue light passage controller (light valve) configured to control the passage/non-passage of the light emitted from the first light emitting panel;

(β) a second image forming device including a second light emitting panel in which second light emitting elements operable to emit green light are arranged in a two-dimensional matrix, and a green light passage controller (light valve) configured to control the passage/non-passage of the light emitted from the second light emitting panel; and (γ) a third image forming device including a third light emitting panel in which third light emitting elements operable to emit red light are arranged in a two-dimensional matrix, and a red light passage controller (light valve) configured to control the passage/non-passage of the light emitted from the third light emitting panel; as well as (δ) a section configured to collect the lights passed through the blue light passage controller, the green light passage controller and the red light passage controller into a single optical path;

wherein the passage/non-passage of the lights emitted from the first light emitting panel, the second light emitting panel and the third light emitting panel is controlled by the light passage controllers (light valves), whereby an image is displayed.

Image Forming Device D

An image forming device D, which is an image forming device for color display of a field sequential system, includes:

(α) a first image forming device having a first light emitting element operable to emit blue light;

(β) a second image forming device having a second light emitting element operable to emit green light; and (γ) a third image forming device having a third light emitting element operable to emit red light; as well as (δ) a section configured to collect the lights emitted from the first image forming device, the second image forming device and the third image forming device into a single optical path; and further includes (ε) a light passage controller (light valve) configured to control the passage/non-passage of the light emitted from the section configured to collect the lights into the single optical path;

wherein the passage/non-passage of the lights emitted from the light emitting elements is controlled by the light passage controller, whereby an image is displayed.

Image Forming Device E

An image forming device E, which also is an image forming device for color display of a field sequential system, includes:

(α) a first image forming device having a first light emitting panel in which first light emitting elements operable to emit blue light are arranged in a two-dimensional matrix;

(β) a second image forming device having a second light emitting panel in which second light emitting elements operable to emit green light are arranged in a two-dimensional matrix; and (γ) a third image forming device having a third light emitting panel in which third light emitting elements operable to emit red light are arranged in a two-dimensional matrix; as well as (δ) a section configured to collect the lights emitted respectively from the first image forming device, the second image forming device and the third image forming device into a single optical path; and further includes (ε) a light passage controller (light valve) configured to control the passage/non-passage of the light emitted from the section configured to collect the lights into the single optical path;

wherein the passage/non-passage of the lights emitted from the light emitting panels is controlled by the light passage controller, whereby an image is displayed.

Image Forming Device F

An image forming device F is an image forming device for color display of a passive matrix type or an active matrix type in which an image is displayed by controlling the respective light-emitting/non-light-emitting states of first light emitting elements, second light emitting elements and third light emitting elements.

Image Forming Device G

An image forming device G, which is an image forming device for color display of a field sequential system, includes light passage controllers (light valves) configured to control the passage/non-passage of lights emitted from light emitting element units arranged in a two-dimensional matrix, wherein the respective light-emitting/non-light-emitting states of first light emitting elements, second light emitting elements and third light emitting elements in the light emitting element units is controlled on a time division basis, and, further, the passage/non-passage of the lights emitted from the first light emitting elements, the second light emitting elements and the third light emitting elements is controlled by the light passage controllers, whereby an image is displayed.

In the image generating device of the first configuration or the image generating device of the second configuration, the beams made to be a plurality of parallel beams by the collimating optical system are made to be incident on the light guide plate. In this case, the requirement for the beams to be parallel beams is based on the requirement that the information on the light wave fronts upon incidence of the beams on the light guide plate should be preserved even after the beams are emitted from the light guide plate through the functions of the first deflecting section and the second deflecting section. Incidentally, the plurality of parallel beams can be generated, specifically, by a configuration in which the image forming device, for example, is located at the place (position) of the focal distance in the collimating optical system. The collimating optical system has a function of converting information on the position of a pixel into information on the angle in the optical system of the optical device. An example of the collimating optical system, there may be mentioned an optical system in which any of a convex lens, a concave lens, a free-form surfaced prism, and a holographic lens may be used either singly or in combination so that the system as a whole has positive optical power.

The light guide plate has two parallel surfaces (a first surface and a second surface) extending in parallel to the axis (Y-direction) of the light guide plate. Where the light guide plate surface on which the beams are incident is referred to as a light guide plate incidence surface and the light guide plate surface through which the beams are emitted from the light guide plate is referred to as a light guide plate emission surface, both the light guide plate incidence surface and the light guide plate emission surface may be composed of the first surface. Or, alternatively, a configuration may be adopted in which the light guide plate incidence surface is composed of the first surface, while the light guide plate emission surface is composed of the second surface. Examples of the material constituting the light guide plate include glasses inclusive of optical glasses such as fused quartz, BK7, etc., and plastic materials (e.g., PMMA (poly methyl methacrylate), polycarbonate resin, acrylic resin, amorphous polypropylene resin, styrene resins inclusive of AS resin (acrylonitrile styrene copolymer)). The shape of the light guide plate is not limited to flat plate-like shapes but may be a curved shape.

Where the head mounted display and the like in the embodiment are of the binocular type, preferably, the optical device as a whole is disposed on the side of the center of the observer's face in relation to the image generating device;

a connecting member for interconnecting the two image display devices is further provided;

the connecting member is mounted to a side, facing to the observer, of a central portion of a frame that is located between the two pupils of the observer; and a projected image of the connecting member is included in a projected image of the frame.

Thus, a structure is adopted in which the connecting member is attached to that central portion of the frame which is located between the observer's two pupils. In other words, a structure in which the image display devices are attached directly to the frame is not adopted here. This ensures that, even if the temple portions are expanded outwards when the frame is mounted to the observer's head with the result of deformation of the frame, such a deformation of the frame would not cause a displacement (positional change) of the image generating device or the optical device, or would cause little such displacement, if any. Therefore, the angle of convergence of left and right images can be securely prevented from being changed. Moreover, since it is unnecessary to enhance the rigidity of the front portion of the frame, it is possible to avoid causing an increase in the weight of the frame, a lowering in design quality, or a rise in cost. Besides, since the image display devices are not attached directly to the eyeglasses frame-like frame, the design, color and the like of the frame can be freely selected according to the observer's taste; thus, there are few restrictions imposed on the design of the frame, so that the degree of freedom on a design basis is high. In addition, the connecting member is disposed between the observer and the frame, and, moreover, the projected image of the connecting member is included in the projected image of the frame. In other words, the connecting member is hidden behind the frame, when the head mounted display is viewed from the front side of the observer. Accordingly, a high design quality can be given to the head mounted display.

Incidentally, the connecting member is preferably so configured as to be attached to the side, facing the observer, of that central part of the front portion which is located between the two pupils of the observer (the part corresponds to the bridge portion of an ordinary pair of eyeglasses).

In the head mounted display, the two image display devices are connected to each other by the connecting member. Specifically, a configuration may be adopted in which the image generating devices are mounted respectively to both end portions of the connecting member so that the mounting condition can be adjusted. In this case, each of the image generating devices is located on the outer side relative to the observer's pupil. In such a configuration, furthermore, it is desirable that the condition of $0.01 \times L \leq \alpha \leq 0.30 \times L$, preferably, $0.05 \times L \leq \alpha \leq 0.25 \times L$, the condition of $0.35 \times L \leq \beta \leq 0.65 \times L$, preferably, $0.45 \times L \leq \beta \leq 0.55 \times L$, and the condition of $0.70 \times L \leq \gamma \leq 0.99 \times L$, preferably $0.75 \times L \leq \gamma \leq 0.95 \times L$ are satisfied, where $\alpha$ is the distance between the center of the mounting portion of the image generating device on one side and one end portion (an endpiece on one the side) of the frame, $\beta$ is the distance from the center of the connecting member to the one end portion (the endpiece on the one side) of the frame, $\gamma$ is the distance between the center of the mounting portion of the image generating device on the other side and the one end portion (the endpiece on the one side) of the frame, and L is the length of the frame. The mounting of the image generating devices respectively to both end portions of the connecting member is specifically carried out, for example, as follows. The connecting member is provided with through-holes at three positions in each of the end portions thereof, whereas the image generating devices are each provided with screw-engagement portions corresponding to the through-holes. Small screws are passed respectively through the through-holes, and are screw engaged with the screw-engagement portions of the image generating devices. A spring is inserted between each small screw and the corresponding screw-engagement portion. This ensures that the mounting condition of the image generating device (the inclination of the image generating device relative to the connecting member) can be adjusted by regulating the fastening condition of each of the small screws.

Here, the expression "the center of the mounting portion of the image generating device" designates the bisection point (midpoint), along the axial direction of the frame, of the overlapping area where the projected image of the image generating device, obtained upon projection of the image generating device and the frame onto a virtual plane in the condition where the image generating device is mounted to the connecting member, overlaps with the projected image of the frame. In addition, the expression "the center of the connecting member" designates the bisection point (midpoint), along the axial direction of the frame, of the area where the connecting member is in contact with the frame in the condition where the connecting member is mounted to the frame. The expression "the length of the frame" is, in the case where the frame is curved, the length of the projected image of the frame. Incidentally, the direction of projection here is the direction perpendicular to the observer's face.

Or, in the head mounted display, the two image display devices are connected to each other by the connecting member. In this case, specifically, a form may also be adopted in which the two optical devices are connected to each other by the connecting member. Incidentally, the two optical devices may sometimes be integrally formed, and, in such a case, the connecting member is attached to the optical devices thus formed integrally. This form, also, is included in the form in which the connecting member is serving for connection between the two optical devices. Where the distance between the center of the image generating device on one side and one end portion of the frame is $\alpha'$ and the distance between the center of the image generating device on the other side and the one end portion of the frame is $\gamma'$, the values of $\alpha'$ and $\gamma'$ are also desirably set in the same manner as the values of $\alpha$ and $\gamma$. Incidentally, the expression "the center of the image generating device" designates the bisection point (midpoint), along the axial direction of the frame, of the area where the projected image of the image generating device, obtained upon projection of the image generating device and the frame onto a virtual plane in the condition where the image generating device is mounted to the optical devices, overlaps with the projected image of the frame.

In the head mounted display, the material constituting the frame may be the same as the material used for an ordinary pair of eyeglasses, such as metals, alloys, plastics, and combinations thereof. The shape of the connecting member is essentially freely settable insofar as the projected image of the connecting member is included in the projected image of the frame; examples of the shape include bar-like shapes and strip-like shapes. Also, examples of the material for forming the connecting member include metals, alloys, plastics, and combinations thereof. Besides, the nose pads may have any of known configurations or structures.

2. Example 1

Example 1 relates to a head mounted display according to an embodiment and image displaying method according to an embodiment.

Figure 2:
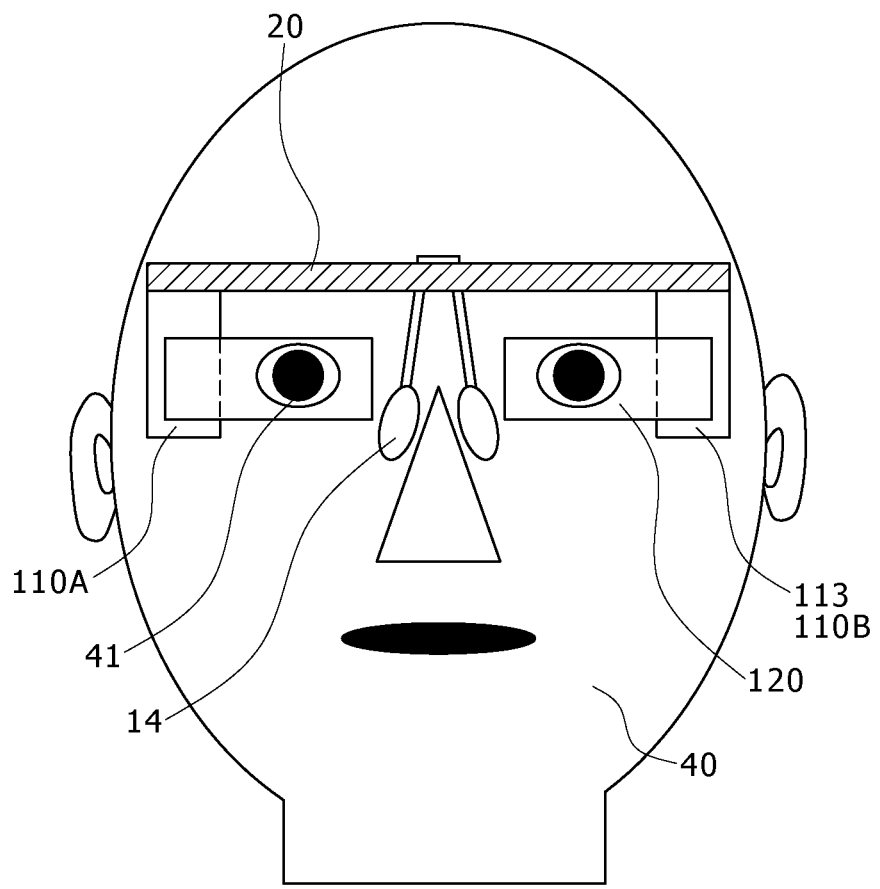
FIG. 2 is a schematic view of the head mounted display according to Example 1 (in an assumed condition where a frame is removed), as viewed from the front side.
Figure 3:
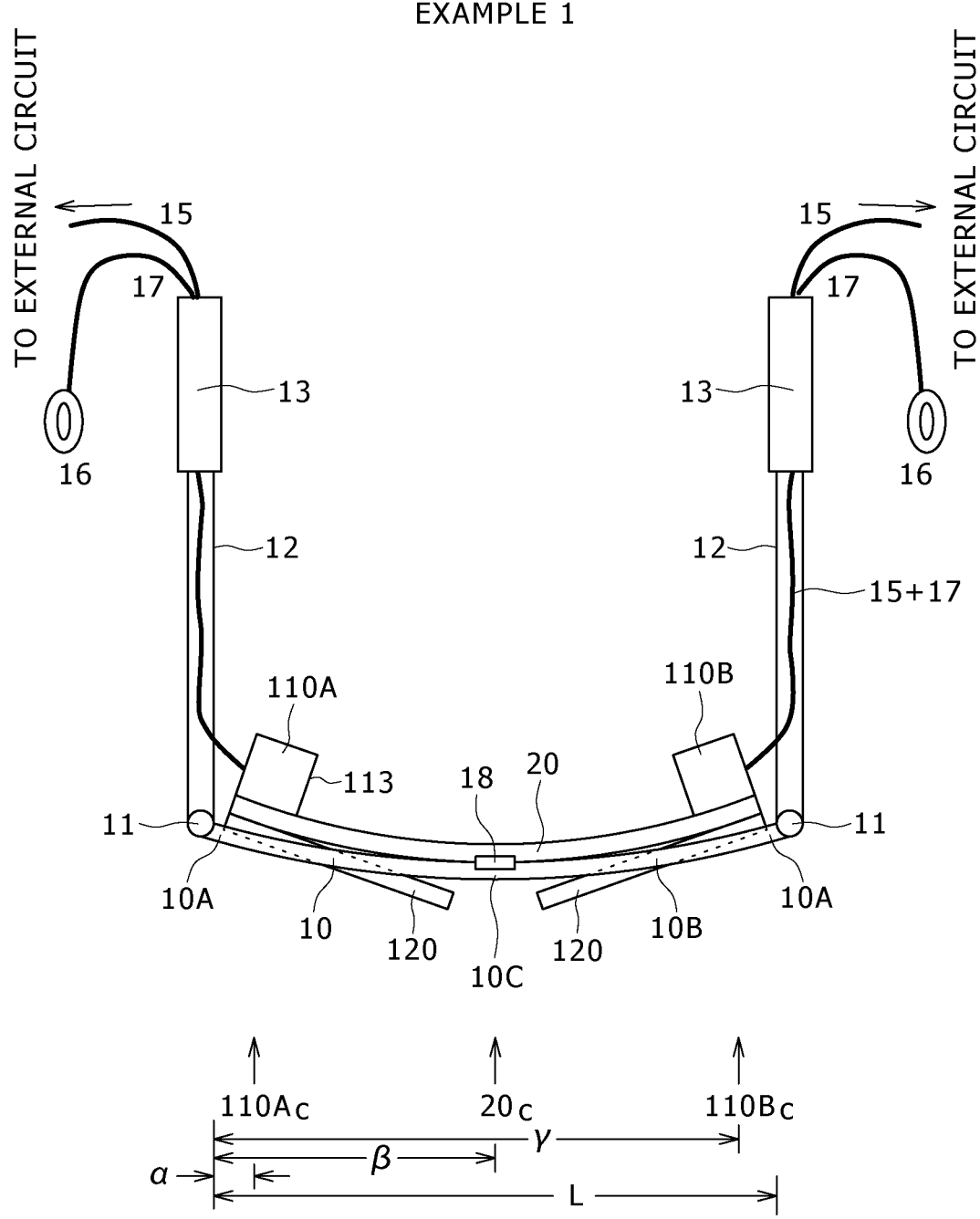
FIG. 3 is a schematic view of the head mounted display according to Example 1, as viewed from the upper side.
Figure 4:
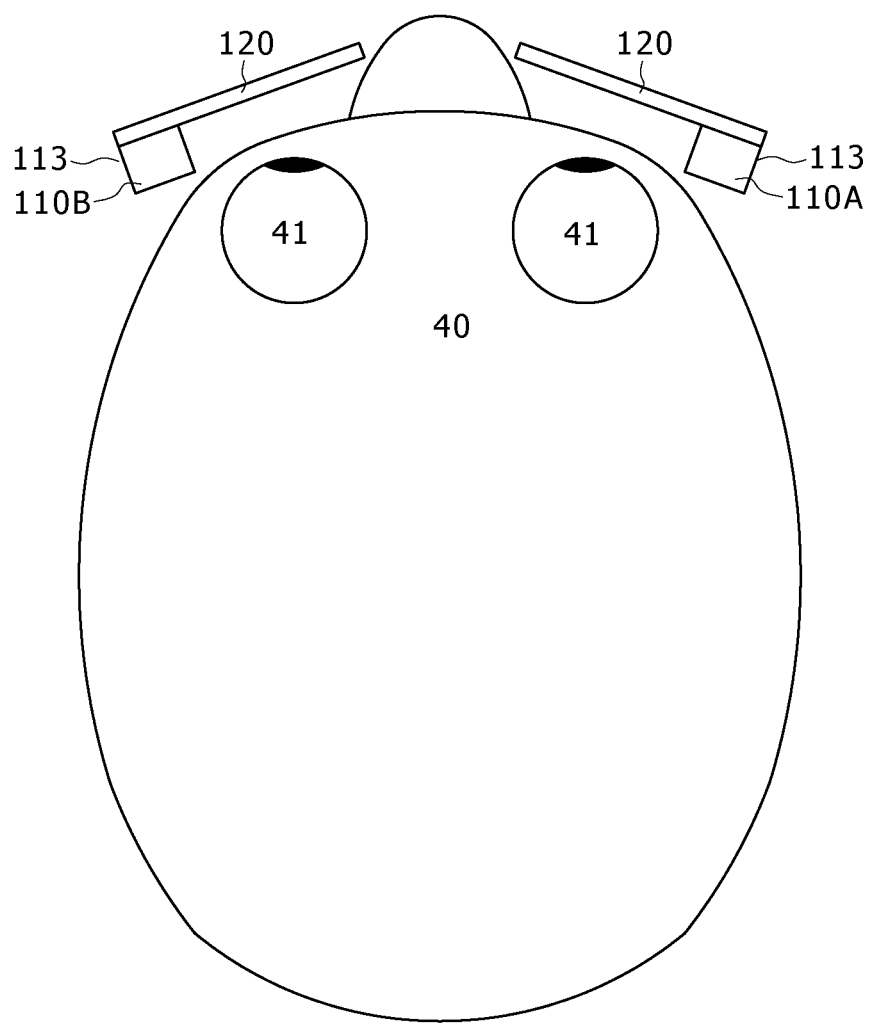
FIG. 4 is a view of the head mounted display according to Example 1 in the state of being mounted on an observer's head, as viewed from the upper side (only image display devices are shown, with the frame omitted)
Figure 5:
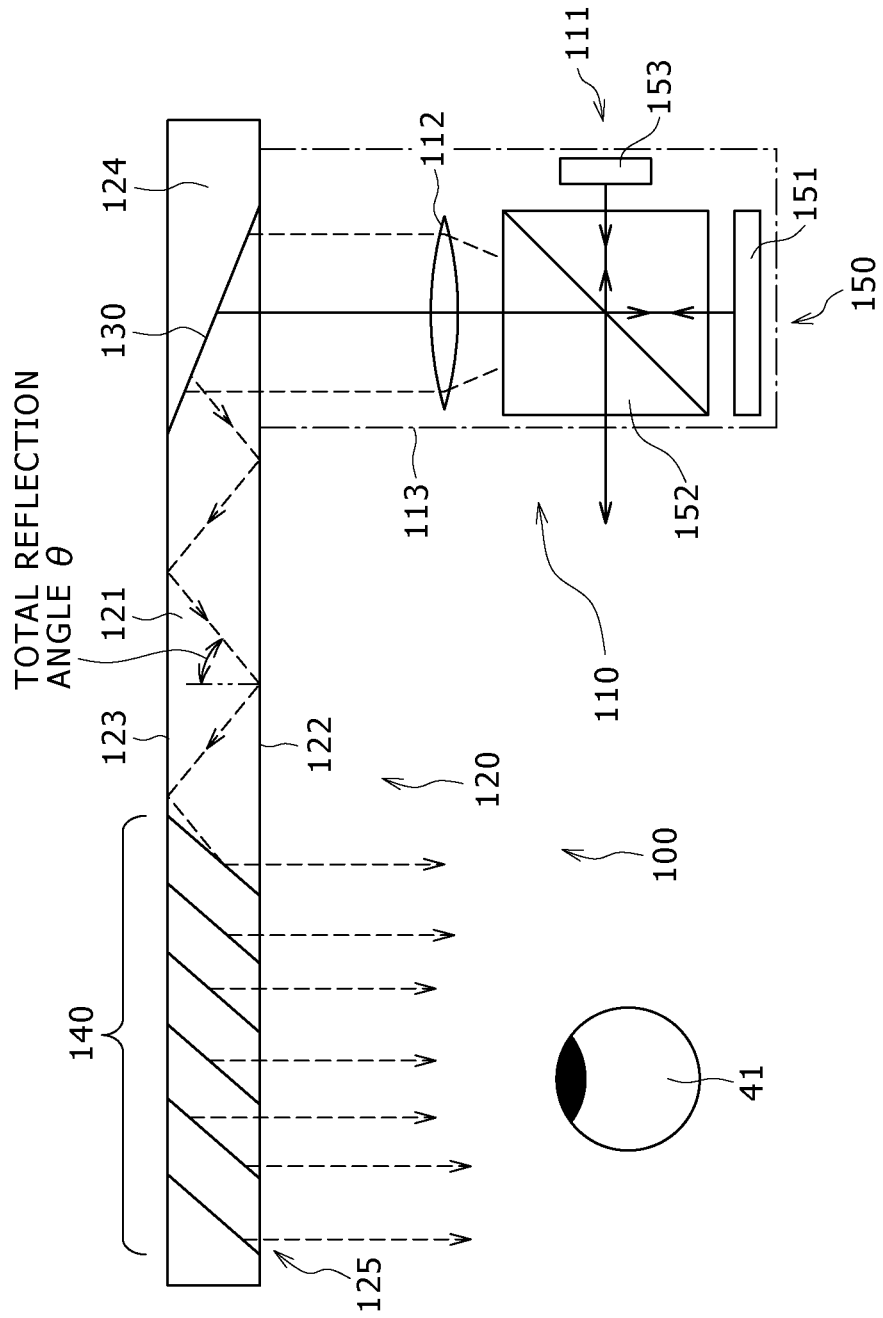
FIG. 5 is a conceptual diagram of the image display device in the head mounted display according to Example 1.

Example 1 relates to a head mounted display according to an embodiment. FIG. 1 shows a schematic view of the head mounted display of Example 1, as viewed from the front side, and FIG. 2 shows a schematic view of the head mounted display of Example 1 (in an assumed condition where a frame is removed), as viewed from the front side. In addition, FIG. 3 shows a schematic view of the head mounted display of Example 1, as viewed from the upper side, and FIG. 4 shows the condition where the head mounted display of Example 1 is mounted to the head of an observer 40, as viewed from the upper side. Incidentally, in FIG. 4, only the image display devices are shown and the frame is omitted, for convenience. Besides, FIG. 5 shows a conceptual diagram of an image display device in the head mounted display of Example 1.

The head mounted display in Example 1 or in Examples 2 to 6 which will be described later includes:

(A) an eyeglasses frame-like frame 10 to be mounted to the head of an observer 40;

(B) image display devices 100;

(C) an image sensing device 18 mounted to the frame; and (D) a correction section 30.

Incidentally, the head mounted display in Example 1 or Examples 2 to 6 described later is assumed to be of the binocular type, that is, of the type in which two image display devices 100 are provided.

The image display device 100 includes:

(B-1) an image generating device 110; and (B-2) a see-through type (semi-transparent type) optical device 120 which is mounted to the image generating device 110, on which beams emitted from the image generating device 110 are incident, through which the beams are guided, and from which the beams are emitted toward the pupil 41 of the observer 40.

Incidentally, the image generating device 110 has the image generating device of the first configuration, and the optical device 120 as a whole is located on the side of the center of the face of the observer 40 in relation to the image generating device 110.

The correction section 30 corrects the sensed image data, obtained through sensing an image of an object by the image sensing device 18, so that an image of the object observed through the optical device 120 (a real-basis image of the object) and an image outputted from the image generating device 110 on the basis of the sensed image data and generated in the optical device 120 (a generated image) are put into register with each other. Or, the sensed image data is corrected by the correction section 30 so that the real-basis image of the object and the generated image are put into register with each other.

The correction section 30, specifically, performs processings for subjecting the sensed image data to rotation, scaling, and transfer, as a correction processing. More specifically, the correction section 30 performs correction of the sensed image data on the basis of an affine transformation matrix.

In addition, the correction section 30 stores therein correction data (correction parameters) obtained upon calibration for correcting reference sensed image data, obtained through sensing an image of a reference object by the image sensing device 18, so that an image of the reference object observed through the optical device 120 (a real-basis image of the reference object) and a reference image outputted from the image generating device 110 on the basis of the reference sensed image data and generated in the optical device 120 (a reference generated image) are put into register with each other. The correction section 30 corrects the sensed image data on the basis of the correction data so that the real-basis image of the object and the generated image are put into register with each other.

Specifically, the correction section 30 performs processings for subjecting the reference sensed image data to rotation, scaling, and transfer, whereby the image of the reference object observed through the optical device 120 and the reference generated image are put into register with each other. Specifically, in the calibration, the processings of rotation, scaling, and transfer of the reference sensed image data are performed by the correction section 30, whereby the image of the reference object observed through the optical device 120 and the reference generated image are put into register with each other. More specifically, correction of the reference sensed image data is carried out based on an affine transformation matrix.

Figure 6:
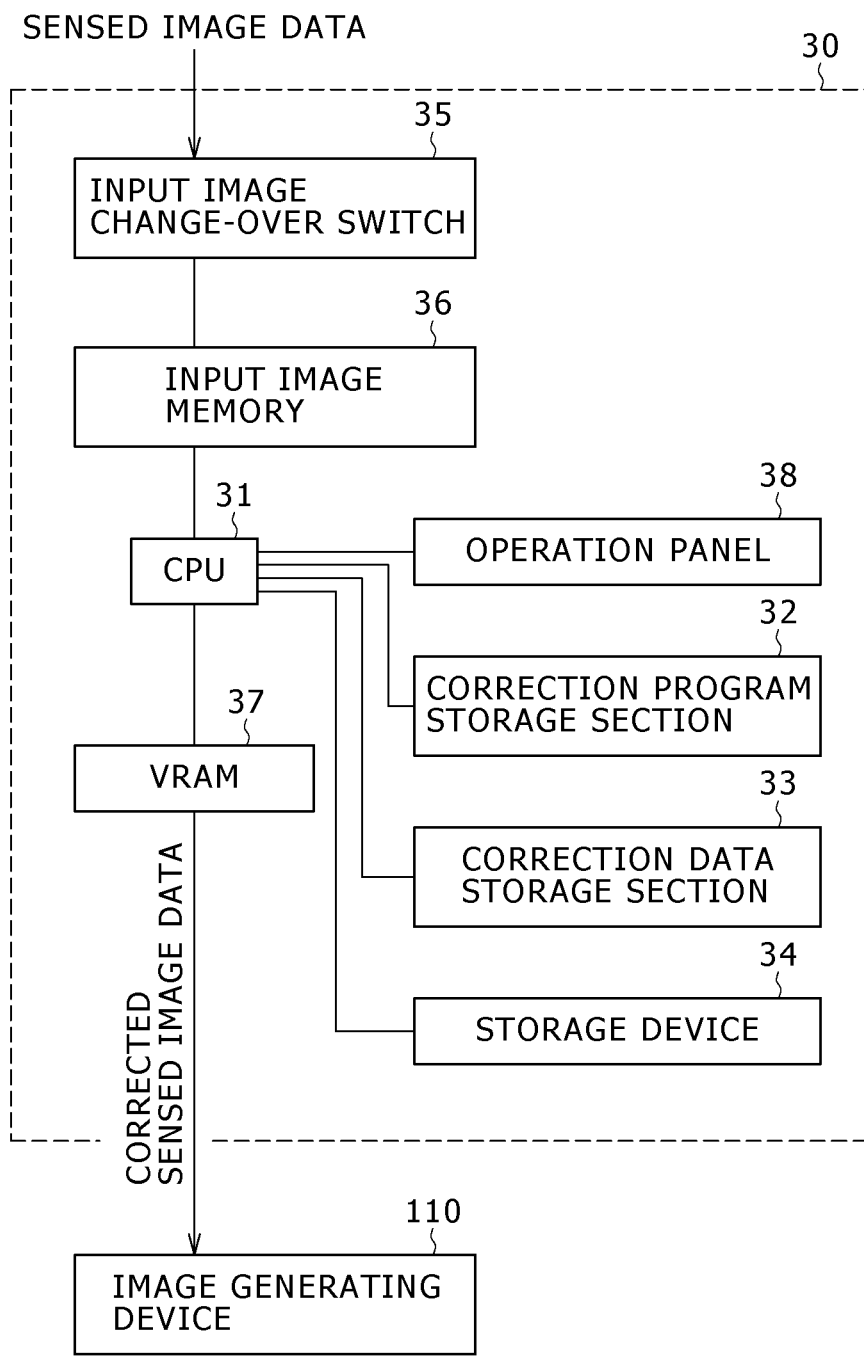
FIG. 6 is a conceptual diagram illustrating a correction section constituting the head mounted display according to Example 1.

As illustrated by the conceptual diagram shown in FIG. 6, the correction section 30 may include a CPU 31, correction program storage means (storage device, memory) 32, correction data storage means (storage device, memory) 33, a storage device 34 storing information on an object (data for identifying the object) therein, an input image change-over switch 35, and a VRAM 37. These components (component parts) constituting the correction section 30 may be known components, and operations of these components themselves are similar to those according to the related art, and, therefore, detailed description of them is omitted here. The correction section 30 has an operation panel 38. In the calibration, processings of rotation, scaling, and transfer of the reference sensed image data are performed by the correction section 30 on the basis of directions given by the observer 40 using the operation panel 38. The correction section 30 displays on the image display devices 100 specific directions, operating methods, guidance, etc. in regard of operations required of the observer 40 in the calibration. Incidentally, the correction section 30 is accommodated in an external circuit (not shown) to which wiring (a signal line, a power supply line, etc.) 15 extending from the image generating device 110A to be described later is connected. In the external circuit (control circuit), further, various processings of image signals are also performed.

Figure 7A:
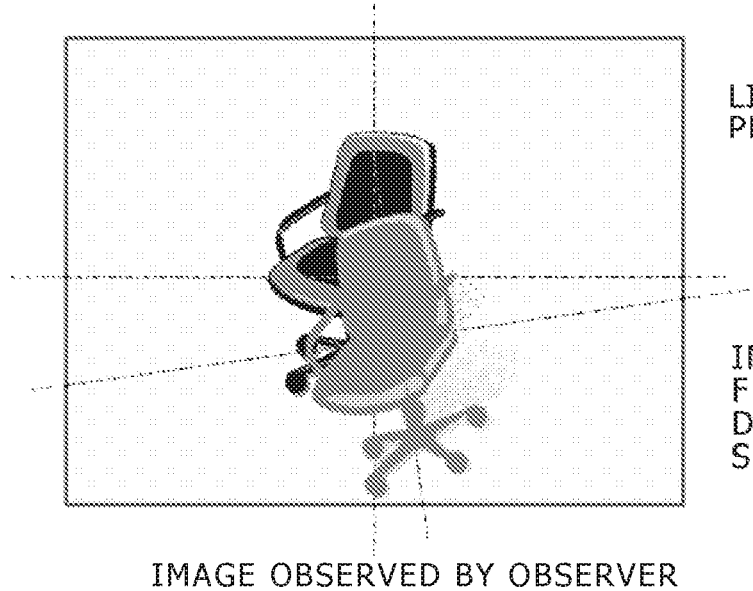
FIGS. 7A and 7B each show an image which is seen when the head mounted display of Example 1 is mounted on a head.

When the observer 40 first mounts the head mounted display on his or her head, the observer 40 sees an image as shown in FIG. 7A. This is a phenomenon arising from a stagger between a real-basis image of an object and a generated image, which, in turn, arises from discordance between the optical axis of the image sensing device 18, the position of the generated image displayed on a light guide plate 121 (described later) through the image generating device 110, and the line of sight of the observer 40. Therefore, such a situation is encountered on the basis of each observer, or, even for the same observer, each time the head mounted display is mounted on the observer's head. Incidentally, in FIGS. 7A and 7B, the "image sensing device" is presented as a "camera."

Figure 7B:
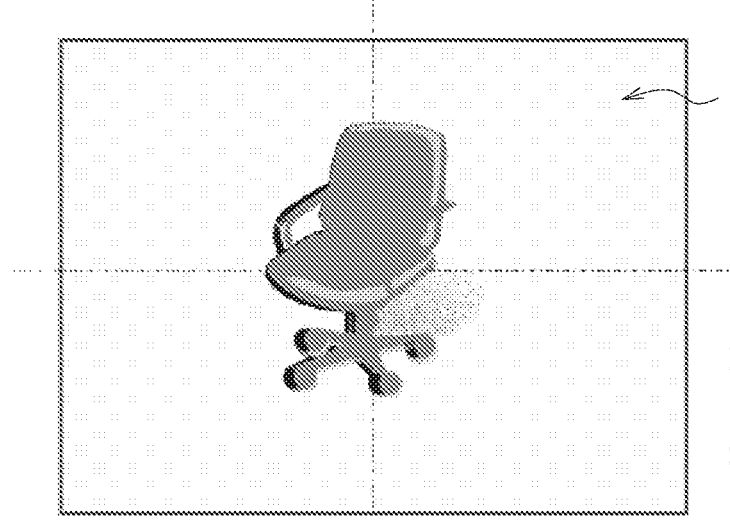

In order to cause the real-basis image of the object and the generated image to coincide with each other, it suffices to correct the sensed image data by the correction section 30 as shown in FIG. 7B. That is, it suffices to correct the sensed image data. Specifically, as for example illustrated by a schematic diagram in FIG. 8, it suffices to find out the conditions in which three points in the real-basis image of the object and three points in the generated image corresponding to the three points in the real-basis image of the object coincide with each other. In other words, it suffices to cause labeled vertexes Q1, Q2 and Q3 of a triangle and labeled vertexes Q1', Q2' and Q3' of another triangle to coincide with each other. If strain of the lens or lenses in the image sensing device and the like are negligible, the conditions for the two triangles to coincide with each other can be represented by use of an equation of affine transformation as a general solution, as the following formula (1), where Q and Q' are position vectors in the light guide plate 121, and M is an affine transformation matrix having three rows and three columns. The correction of the sensed image data by the correction section 30 is a processing in which the sensed image data obtained through sensing an image of an object by the image sensing device 18 is corrected by applying the matrix M thereto and outputting an image signal to the image generating device 110. In addition, the calibration by the correction section 30 is setting of the matrix M in the formula (1) based on the reference sensed image data obtained through sensing an image of a reference object by the image sensing device 18. The affine transformation matrix M can be factorized to be represented by the formula (2).

$$Q' = M \cdot Q \qquad (1)$$

$$M = S \cdot R \cdot T \qquad (2)$$

Figure 10:
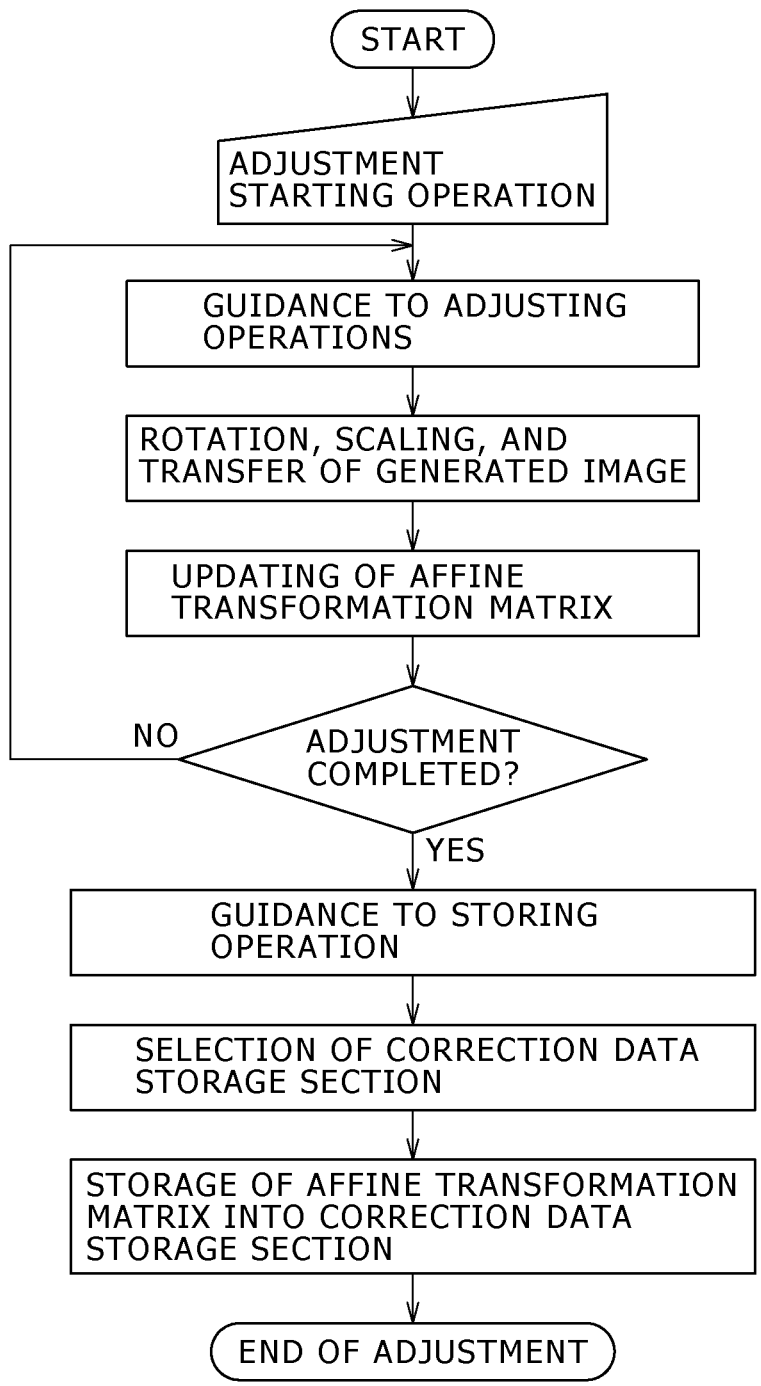
FIG. 10 is a flow chart for operations in the correction processing in Example 1.

In the formula (2), S, R and T are also matrices having three rows and three columns, wherein the matrix S represents scaling, the matrix R represents rotation, and the matrix T represents transfer. Where the affine transformation matrix is factorized as represented by the formula (2), the operation to be performed by the observer 40 is to set the matrices S, R and T. Specifically, buttons or levers (not shown) for performing eight kinds of controls corresponding to upward, downward, leftward and rightward transfers, clockwise and counterclockwise rotations, and scaling (enlargement and reduction) are disposed at the operation panel 38 provided in the correction section 30. If these operations are carried out without following an appropriately set order, it may become impossible to adequately recognize the operations. In the calibration, therefore, character strings or schematic figures are presented on the light guide plate 121 through the image generating device 110 to assist the observer 40 in carrying out the operations. An example of wordings in the case of displaying the character strings is shown in FIG. 9. Incidentally, in FIG. 9, the "memory" means the correction data storage section 33. In addition, a flow chart for operations in the calibration is shown in FIG. 10. Incidentally, the sequence of the operations for upward, downward, leftward and rightward transfers, clockwise and counterclockwise rotations, and scaling (enlargement and reduction) is essentially arbitrary.

Specifically, first, as shown in FIG. 10, the input image change-over switch 35 is switched over in an adjustment starting operation to proceeds into a calibration mode, whereon the CPU 31 reads a correction program from the correction program storage section 32. On the other hand, an image of a reference object sensed by the image sensing device 18 is converted into an image signal in an external circuit, is once stored in the input image memory 36, is inputted to the CPU 31, is subjected to signal processing, is then sent through the VRAM 37 out to the image generating device 110, and is displayed as a reference generated image on the light guide plate 121. Besides, specific directions, operating methods, guidance, etc. are displayed on the image display device 100 by the correction section 30 (see the step of "guidance to adjusting operations" in FIG. 10). Then, the buttons or levers at the operation panel 38 are operated as above-mentioned so that the reference generated image will be put into register with the reference object (see the step of "rotation, scaling and transfer of generated image" in FIG. 10). Next, when the reference generated image and the reference object have got in register with each other, the buttons or levers at the operation panel 38 are operated to give a direction for updating the affine transformation matrix to the correction section 30 (see the step of "updating of affine transformation matrix" in FIG. 10). Subsequently, when the adjustment has been completed, the correction data storage section 33 is selected on the basis of the direction of adjustment operation guide displayed on the image display device 100, the updated affine transformation matrix (the 3-row 3-column matrices S, R and T, or the matrix M) is stored in the correction data storage section 33, and the calibration is completed.

In observation of an ordinary object, the correction section 30 corrects the sensed image data on the basis of the correction data so that the real-basis image of the object and the generated image are put into register with each other. Then, based on the sensed image data thus corrected, the information on the object (for example, data for identifying the object) stored in the storage device 34 provided in the correction section 30 can be displayed on the light guide plate 121 via the image generating device 110. That is, the AR technology can be realized. In this manner, by obtaining the generated image through using the affine transformation matrix itself as correction data (correction parameters), it is possible to display an image or part of an image or to display information on an object, while keeping the positional relationship relative to the real-basis image of the object.

Incidentally, it is highly possible that the affine transformation matrix, namely, the matrix M may differ from observer to observer. In the case where one head mounted display is used in common by a plurality of observers, therefore, it is preferable that a plurality of matrices M are preliminarily stored so that each observer can select a relevant one of the matrices M. For this purpose, it suffices that the selection of the correction data storage section 33 and storage of the updated affine transformation matrix into the selected correction data storage section 33 are conducted as above-mentioned, whereby a plurality of matrices M are preliminarily stored in the correction data storage section 33, and thereafter the relevant matrix M is read out, as required.

Thus, in Example 1, the sensed image data is corrected by the correction section 30 so that the real-basis image of the object and the generated image are put into register with each other. Therefore, even if a change is generated in the spatial positional relationship between the optical axis of the image sensing device 18 or the line of sight of the observer 40 and the image display device (more specifically, the optical device 120) when the head mounted display is mounted on the head of the observer 40, the sensed image data is corrected as above-mentioned, so that discordance or mismatch would not be generated between the information on an object which is preliminarily acquired and stored in the head mounted display and the information of the object obtained through the operation of the image sensing device 18, and the AR technology can be realized assuredly and easily.

Incidentally, in the calibration, the directions for subjecting the reference sensed image data to rotation, scaling, and transfer can be given to the correction section 30 also by sensing an image of a motion of the observer 40 (for example, a motion of an observer's hand) by the image sensing device 18 and analyzing the sensed image by the correction section 30, instead of operating the operation panel 38. Such operations can be realized by a known algorithm or software.

In addition, at the time of the calibration, at least part of the contour of the reference generated image which is outputted from the image generating device 110 based on the reference sensed image data, obtained upon sensing an image of a reference object by the image sensing device 18, and which is generated in the optical device 120 may be enhanced by the correction section 30. Specifically, in the case of performing such a contour extraction (contour enhancement), it suffices, for example, to apply a differential filter such as a Laplacian filter to image signals pertaining to all the pixels constituting an image. Or, at the time of calibration, the color of the reference generated image may be made to be different from the color of the reference object by the correction section 30. Specifically, it suffices, for example, to apply such an operation of reducing an image signal value of each pixel from an upper limit value of the image signals, to all the pixels constituting an image. With any of these configurations adopted, it becomes possible for the observer to easily judge whether or not the real-basis image of a reference object and the reference generated image generated in the optical device 120 are in register with each other.

Or, the correction data (correction parameters) may include distance reference data, which is data on the distance from a reference object to the image sensing device 18 at the time of calibration. Then, at the time of correcting the sensed image data so that the real-basis image of an object and the generated image are put into register with each other, the sensed image data may be corrected by the correction section 30 on the basis of the data on the distance from the object to the image sensing device 18 and the distance reference data. In this way, correction of the sensed image data can be performed more accurately. Incidentally, where the image sensing device 18 is not equipped with means for measuring the distance from an object to the image sensing device 18, it suffices to ensure that the observer 40 can input to the correction section 30 the rough data on the distance from a reference object to the image sensing device 18 at the time of calibration. Specifically, it suffices to provide the correction section 30 with a selector switch (or button) or the like with which "near," "medium-range," "far," or the like or, alternatively, "1 m," "3 m," "∞" or the like can be inputted as distance. Also, the data on the distance from an object to the image sensing device 18 may be inputted through a selector switch (or button) or the like with which "near," "medium-range," "far" or the like or, alternately, "1 m," "3 m," "∞" or the like can be inputted.

Hereinafter, the frame 10 and the image display device 100 will be described.

In addition, in the head mounted display of Example 1, the head mounted display of Example 1 further includes a connecting member 20 for connecting the two image display devices 100 to each other. The connecting member 20 is mounted to a side, facing to the observer, of a central portion 10C of the frame 10 that is located between the two pupils 41 of the observer 40 (in other words, the connecting member 20 is mounted between the observer 40 and the frame 10) by use of, for example, screws (not shown). Further, the projected image of the connecting member 20 is included in the projected image of the frame 10. In other words, when the head mounted display is viewed from the front side of the observer 40, the connecting member 20 is hidden behind the frame 10, so that the connecting member 20 is not visible.

In the head mounted display of Example 1, the two image display devices 100 are coupled to each other by the connecting member 20. Specifically, image generating devices 110A and 110B are mounted respectively to both end portions of the connecting member 20 so that the mounting condition can be adjusted. Besides, each of the image generating devices 110A and 110B is located on the outer side relative to the pupil 41 of the observer 40. To be more specific, the relations:

$$\alpha = 0.1 \times L$$

$$\beta = 0.5 \times L$$

$$\gamma = 0.9 \times L$$

are established, where α is the distance between the mounting portion center 110AC of the image generating device 110A on one side and one end portion (an endpiece on one side) 10A of the frame 10, β is the distance from the center 20c of the connecting member 20 to the one end portion (the endpiece on the one side) 10A of the frame 10, γ is the distance between the mounting portion center 110BC of the image generating device 110B on the other side and the one end portion (the endpiece on the one side) 10A of the frame 10, and L is the length of the frame 10.

The mounting of the image generating devices (specifically, the image generating devices 110A and 110B) respectively onto the end portions of the connecting member 20 is specifically carried out, for example, as follows. The connecting member 20 is provided with through-holes (not shown) at three positions in each end portion thereof, the image generating devices 110A and 110B are provided with tapped holes (screw-engagement portions, not shown) corresponding to the through-holes, screws (not shown) are passed respectively through the through-holes, and the screws are screw engaged with the holes formed in the image generating devices 110A and 110B. A spring is inserted between each screw and the corresponding hole. This ensures that the mounting condition of each image generating device (the inclination of each image generating device relative to the connecting member) can be adjusted by regulating the fastening conditions of the screws. After the mounting, the screws are hidden by a cover (not shown). Incidentally, in FIG. 2, 15, or 18, the connecting member 20, 21 is hatched so that the connecting member 20, 21 is clearly shown.

The frame 10 includes a front portion 10B disposed on the front side of the observer 40, two temple portions 12 turnably mounted to both ends of the front portion 10B through hinges 11, respectively, and end cover portions (also called tips, ear pieces, or ear pads) 13 are mounted respectively to tip end portions of the temple portions 12. The connecting member 20 is mounted to the central portion 10C (corresponding to the portion of a bridge in an ordinary pair of eyeglasses) of the front portion 10B which is located between the two pupils 41 of the observer 40. In addition, nose pads 14 are mounted to a side, facing to the observer 40, of the connecting member 20. Incidentally, in FIG. 3, 16 or 19, the nose pads 14 are omitted from drawing. The frame 10 and the connecting member 20 are each formed from a metal or a plastic. The shape of the connecting member 20 is a curved bar-like shape.

Further, a wiring (a signal line, a power supply line, etc.) 15 extended from the image generating device 110A on one side extends through the inside of the temple portion 12 and the end cover portion 13 and extends from a tip portion of the end cover portion 13 to the exterior thereby connecting to an external circuit (not shown). Furthermore, the image generating devices 110A and 110B are each provided with a headphone portion 16. A headphone wiring 17 extended from each of the image generating devices 110A and 110B extends through the inside of the temple portion 12 and the end cover portion 13 and extends from the tip portion of the end cover portion 13 to the headphone portion 16. More specifically, the headphone wiring 17 extends from the tip portion of the end cover portion 13 to the headphone portion 16 in the manner of going around the rear side of the auricle (concha). Such a configuration ensures that an impression of disturbed laying of the headphone portions 16 and/or the headphone wirings 17 can be eliminated and that a cleanly appearing head mounted display can be realized.

In addition, an image sensing device 18 including a solid-state image sensing element (which includes a CCD or CMOS sensor) and a lens (these are not shown) is mounted to the central portion 10C of the front portion 10B. Specifically, the central portion 10C is provided with a through-hole, the connecting member 20 is provided with a recess in its portion corresponding to the through-hole formed in the central portion 10C, and the image sensing device 18 is disposed in the recess. Light incident through the through-hole formed in the central portion 10C is condensed by the lens onto the solid-state image sensing element. A signal from the solid-state image sensing element is outputted to the image generating device 110A through a wiring (not shown) extended from the image sensing device 18, and is further outputted to the external circuit. Incidentally, the wiring is laid to pass between the connecting member 20 and the front portion 10B, and is connected to the image generating device 110A on one side. Such a configuration ensures that the structure of incorporation of the image sensing device in the head mounted display is prevented from being easily seen.

In Example 1, as shown in FIG. 5, the optical device 120 includes:

(a) a light guide plate 121 which as a whole is disposed on the side of the center of the face of the observer 40 relative to the image generating device 110, on which the beams emitted from the image generating device 110 are incident, through which the beams are guided, and from which the beams are emitted toward the pupil 41 of the observer 40;

(b) a first deflecting section 130 operable to deflect the beams entering the light guide plate 121 so that the beams entering the light guide plate 121 undergo total reflections in the inside of the light guide plate 121; and (c) a second deflecting section 140 by which the beams propagated through the inside of the light guide plate 121 while undergoing total reflections are deflected a plurality of times so that the beams propagated through the inside of the light guide plate 121 while undergoing total reflections are emitted from the light guide plate 121.

The first deflecting section 130 and the second deflecting section 140 are disposed inside the light guide plate 121. The first deflecting section 130 reflects the beams entering the light guide plate 121, whereas the second deflecting section 140 transmits and reflects a plurality of times the beams propagated through the inside of the light guide plate 121 while undergoing total reflections. In other words, the first deflecting section 130 functions as a reflecting mirror, whereas the second deflecting section 140 functions as a semi-transparent mirror. More specifically, the first deflecting section 130 provided inside the light guide plate 121 includes a light-reflective film (a kind of mirror) which is formed from aluminum and by which the beams entering the light guide plate 121 are reflected. On the other hand, the second deflecting section 140 provided inside the light guide plate 121 includes a multilayer laminated structure in which a multiplicity of dielectric laminated films are laminated. The dielectric laminated film includes, for example, a TiO2 film as a high-dielectric-constant material and an SiO2 film as a low-dielectric-constant material. A multilayer laminated structure in which a multiplicity of dielectric laminated films are laminated is disclosed in JP-T-2005-521099. While six-layer dielectric laminated film is shown in the figure, this configuration is not limitative. A membrane formed of the same material as the material constituting the light guide plate 121 is sandwiched between one dielectric laminated film and the next dielectric laminated film. Incidentally, at the first deflecting section 130, the parallel beams entering the light guide plate 121 is reflected (or diffracted) so that the parallel beams entering the light guide plate 121 undergo total reflections in the inside of the light guide plate 121. On the other hand, in the second deflecting section 140, the parallel beams propagated through the inside of the light guide plate 121 while undergoing total reflections are reflected (or diffracted) a plurality of times, and they are emitted from the light guide plate 121 in the state of parallel beams.

The first deflecting section 130 may be formed by a method in which a portion 124 of the light guide plate 121 where to provide the first deflecting section 130 is cut off to provide the light guide plate 121 with a slant surface on which to form the first deflecting section 130, a light-reflective film is vacuum evaporated on the slant surface, and then the cut-off portion 124 of the light guide plate 121 is adhered to the first deflecting section 130. In addition, the second deflecting section 140 may be formed by a method in which a multilayer laminated structure in which a multiplicity of membranes of the same material (e.g., glass) as the material constituting the light guide plate 121 and a multiplicity of dielectric laminated films (formable by vacuum evaporation, for example) are laminated is produced, a portion 125 of the light guide plate 121 where to provide the second deflecting section 140 is cut off to form a slant surface, the multilayer laminated structure is adhered to the slant surface, and the outer shape of that portion is put in order by polishing or the like. In this manner, the optical device 120 having the first deflecting section 130 and the second deflecting section 140 provided inside the light guide plate 121 can be obtained.

The light guide plate 121 formed from an optical glass or a plastic material has two parallel surfaces (a first surface 122 and a second surface 123) extending in parallel to the axis of the light guide plate 121. The first surface 122 and the second surface 123 are on the opposite sides. Parallel beams enter the light guide plate 121 through the first surface 122 corresponding to the light incidence surface, are propagated through the inside of the light guide plate 121 while undergoing total reflections, and are emitted from the light guide plate 121 through the first surface 122 corresponding to the light emission surface.

In addition, the image generating device 110 includes an image generating device of the first configuration. As shown in FIG. 5, the image generating device includes:

(a) an image forming device 111 having a plurality of pixels arranged in a two-dimensional matrix; and (b) a collimating optical system 112 by which beams emitted from the pixels of the image forming device 111 are turned into parallel beams. Incidentally, each image generating device 110 as a whole is accommodated in a casing 113 (in FIG. 5, indicated by dot-dash lines). The casing 113 is provided with an aperture (not shown), and beams are emitted from the collimating optical system 112 through the aperture. Each casing 113 is mounted to an end portion of the connecting member 20 by use of three screws (not shown), as above-mentioned. Besides, the optical device 120 is mounted to the casing 113.

Here, the image forming device 111 includes a reflection-type spatial light modulator 150, and a light source 153 including a light emitting diode operable to emit white light. Specifically, the reflection-type spatial light modulator 150 includes a liquid crystal display device (LCD) 151 having an LCOS as a light valve, and a polarization beam splitter 152 by which part of the light from the light source 153 is reflected and guided to the liquid crystal display device 151 and through which part of the light reflected by the liquid crystal display device 151 is passed and guided to the collimating optical system 112. The liquid crystal display device 151 has a plurality of (for example, 320×240) pixels (liquid crystal cells) arranged in a two-dimensional matrix. The polarization beam splitter 152 has a known configuration or structure. Non-polarized light emitted from the light source 153 impinges on the polarization beam splitter 152. In the polarization beam splitter 152, a P-polarized light component is permitted to pass through, to be emitted to the exterior of the system. On the other hand, an S-polarized light component is reflected in the polarization beam splitter 152, enters the liquid crystal display device 151, and is reflected in the inside of the liquid crystal display device 151, to be emitted from the liquid crystal display device 151. Here, of the light emitted from the liquid crystal display device 151, the beams emitted from the pixels for displaying "white" contain the P-polarized light component in a high proportion, whereas the beams emitted from the pixels for displaying "black" contain the S-polarized light component in a high proportion. Therefore, of the light emitted from the liquid crystal display device 151 and impinging on the polarization beam splitter 152, the P-polarized light component is permitted to pass through the polarization beam splitter 152, to be guided to the collimating optical system 112. On the other hand, the S-polarized light component is reflected in the polarization beam splitter 152, to be guided back to the light source 153. The liquid crystal display device 151 has, for example, a plurality of (e.g., 320×240) pixels (the number of liquid crystal cells is three times the number of pixels) arranged in a two-dimensional matrix. The collimating optical system 112 includes, for example, a convex lens. For producing parallel beams, the image forming device 111 (more specifically, the liquid crystal display device 151) is disposed at the place (position) of the focal distance in the collimating optical system 112. In addition, one pixel includes a red light emitting sub-pixel for emitting red light, a green light emitting sub-pixel for emitting green light, and a blue light emitting sub-pixel for emitting blue light.

In this manner, in the head mounted display (HMD) of Example 1, the connecting member 20 connects the two image display devices 100 to each other, and the connecting member 20 is mounted to that central portion 10C of the frame 10 which is located between the two pupils 41 of the observer 40. In other words, the image display devices 100 are not mounted directly to the frame 10. Therefore, even in the case where upon mounting of the frame 10 onto the head of the observer 40 the temple portions 12 are spread toward the outer sides with the result of a deformation of the frame 10, such a deformation of the frame 10 leads to no or extremely little, if any, displacement (positional change) of the image generating devices 110A, 110B. Accordingly, generation of a change in the angle of convergence between left and right images can be securely prevented from occurring. Moreover, since it is unnecessary to enhance the rigidity of the front portion 10B of the frame 10, it is possible to obviate the generation of an increase in the weight of the frame 10, a lowering in design properties, or an increase in cost. Besides, since the image display devices 100 are not mounted directly to the frame 10 resembling a frame of a pair of eyeglasses, the design and color and the like of the frame 10 can be freely selected according to the observer's taste, and there are few restrictions imposed on the design of the frame 10; thus, there is a high degree of freedom on a design basis. In addition, when the head mounted display is viewed from the front side of the observer, the connecting member 20 is hidden behind the frame 10. Accordingly, high design properties can be imparted to the head mounted display.

3. Example 2

Example 2 resides in a modification of Example 1. FIG. 11 shows a conceptual diagram of an image display device 200 in a head mounted display according to Example 2. As shown in FIG. 11, in Example 2, an image generating device 210 includes an image generating device of the second configuration. Specifically, the image generating device includes:

(a) a light source 251;

(b) a collimating optical system 252 by which beams emitted from the light source 251 are made to be parallel beams;

(c) a scanning section 253 configured to scan the parallel beams emitted from the collimating optical system 252; and (d) a relay optical system 254 by which the parallel beams scanned by the scanning section 253 are relayed and emitted. Incidentally, the image generating device 210 as a whole is accommodated in a casing 213 (in FIG. 11, indicated by dot-dash lines). The casing 213 is provided with an aperture (not shown), and the beams are emitted from the relay optical system 254 through the aperture. Each casing 213 is mounted to an end portion of a connecting member 20 by use of small screws or an adhesive (not shown). Besides, an optical device 120 is mounted to the casing 213.

The light source 251 includes a red light emitting element 251R operable to emit red light, a green light emitting element 251G operable to emit green light, and a blue light emitting element 251B operable to emit blue light, and each of the light emitting elements includes a semiconductor laser element. The three primary color light beams emitted from the light source 251 are passed through a crossed prism 255, whereby color synthesis is performed and the beams are guided into a single optical path, to be incident on the collimating optical system 252 having positive optical power as a whole, from which the beams are emitted as parallel beams. The parallel beams are reflected by a total reflection mirror 256. Then, horizontal scanning and vertical scanning are conducted by a scanning section 253 including a MEMS in which a micromirror can be rotated in two-dimensional directions and by which the incident parallel beams can be scanned in a two-dimensional manner. By the scanning, the parallel beams are converted into a kind of two-dimensional image, resulting in the generation of a virtual image. Then, the beams from the virtual image are passed through the relay optical system 254 including a known relay optical system, and a luminous flux made to be parallel beams is incident on the optical device 120.

The optical device 120 on which the luminous flux made to be parallel beams by the relay optical system 254 is incident, through which the luminous flux is guided, and from which the luminous flux is emitted has the same structure or configuration as that of the optical device described in Example 1 above. Therefore, detailed description of the optical device 120 is omitted here. In addition, the head mounted display of Example 2 also has substantially the same configuration or structure as that of the head mounted display of Example 1 above, except for the difference as to the image generating device 210. Therefore, detailed description of the head mounted display is omitted here.

4. Example 3

Example 3 also resides in a modification of Example 1. FIG. 12A shows a conceptual diagram of an image display device 300 in a head mounted display according to Example 3. Besides, FIG. 12B shows a schematic sectional view illustrating part of a reflection-type volume holographic diffraction grating, in an enlarged form. In Example 3, an image generating device 110 includes an image generating device of the first configuration, in the same manner as in Example 1. In addition, an optical device 320 is the same as the optical device 120 of Example 1 in basic configuration or structure, as it includes:

(a) a light guide plate 321 which as a whole is disposed on the side of the center of the face of the observer 40 relative to the image generating device 110, on which the beams emitted from the image generating device 110 are incident, through which the beams are guided, and from which the beams are emitted toward the pupil 41 of the observer 40;

(b) a first deflecting section operable to deflect the beams entering the light guide plate 321 so that the beams entering the light guide plate 321 undergo total reflections in the inside of the light guide plate 321; and (c) a second deflecting section by which the beams propagated through the inside of the light guide plate 321 while undergoing total reflections are deflected a plurality of times so that the beams propagated through the inside of the light guide plate 321 while undergoing total reflections are emitted from the light guide plate 321, except for differences in the configurations or structures of the first deflecting section and the second deflecting section.

In Example 3, the first deflecting section and the second deflecting section are disposed on a surface of the light guide plate 321 (specifically, a second surface 323 of the light guide plate 321). The first deflecting section diffracts the beams entering the light guide plate 321, whereas the second deflecting section diffracts a plurality of times the beams propagated through the inside of the light guide plate 321 while undergoing total reflections. Here, the first deflecting section and the second deflecting section each include a diffraction grating element, specifically, a reflection-type diffraction grating element, more specifically, a reflection-type volume holographic diffraction grating. In the following description, the first deflecting section including a reflection-type volume holographic diffraction grating will be referred to as "first diffraction grating member 330" for convenience, and the second deflecting section including a reflection-type volume holographic diffraction grating will be referred to as "second diffraction grating member 340" for convenience.

Figure 13:
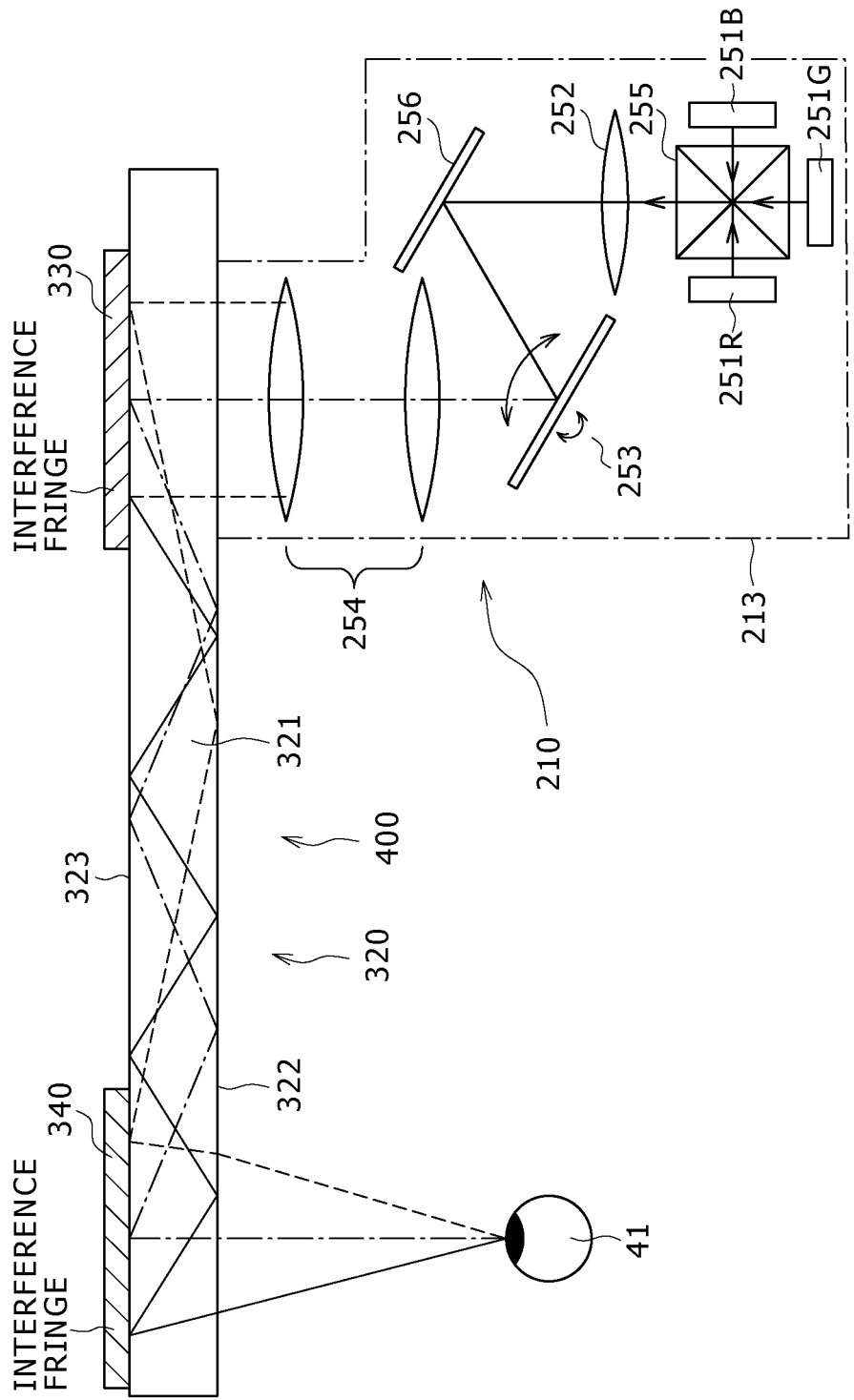
FIG. 13 is a conceptual diagram of an image display device in a head mounted display according to Example 4.

In Example 3, or in Examples 4 and 6 to be described later, the first diffraction grating member 330 and the second diffraction grating member 340 each have a configuration in which, for corresponding to diffraction/reflection of P kinds of beams having different P kinds of wavelength bands (or wavelengths) (specifically, P=3, for three kinds of colors, i.e., red, green, and blue), P layers of diffraction grating layers each including a reflection-type volume holographic diffraction grating are laminated. Incidentally, each of the diffraction grating layers composed of photopolymer materials is formed therein with interference fringes corresponding to one kind of wavelength band (or wavelength), and is produced by a related-art method. Specifically, the first diffraction grating member 330 and the second diffraction grating member 340 each have a structure in which a diffraction grating layer for diffraction/reflection of red light, a diffraction grating layer for diffraction/reflection of green light, and a diffraction grating layer for diffraction/reflection of blue light are laminated. The pitch of the interference fringes formed in the diffraction grating layer (diffraction optical element) is constant, the interference fringes are rectilinear in shape, and they are parallel to a Z-axis direction. Incidentally, the axial direction of the first diffraction grating member 330 and the second diffraction grating member 340 is taken as a Y-axis direction, and the normal direction is taken as an X-axis direction. In FIGS. 12A and 13, the first diffraction grating member 330 and the second diffraction grating member 340 are shown in the form of a single layer. When such a configuration as just-mentioned is adopted, it is possible to contrive an enhanced diffraction efficiency, an enlarged diffraction acceptance angle, and an optimized diffraction angle, with respect to the diffraction/reflection of a beam having each wavelength band (or wavelength) at the first diffraction grating member 330 and the second diffraction grating member.

FIG. 12B is a schematic sectional view showing, in an enlarged form, part of a reflection-type volume holographic diffraction grating. The reflection-type volume holographic diffraction grating is formed therein with interference fringes having a slant angle φ. Here, the slant angle φ designates the angle formed between a surface of the reflection-type volume holographic diffraction grating and the interference fringes. The interference fringes are formed in a zone ranging from the inside to the surface of the reflection-type volume holographic diffraction grating. The interference fringes are satisfying the Bragg condition. Here, the Bragg condition designates a condition of satisfying the formula (A) below, where m is a positive integer, λ is wavelength, d is the pitch of lattice planes (the spacing in the normal direction of virtual planes containing the interference fringes), and Θ is the complementary angle of the angle of incidence on the interference fringes. Besides, the relations among Θ, the slant angle φ, and an angle of incidence ψ in the case where a beam is incident on the diffraction grating member at the angle of incidence ψ are as shown in the formula (B) below.

$$m \cdot \lambda = 2 \cdot d \cdot \sin(\Theta) \tag{A}$$

$$\Theta = 90° - (\varphi + \psi) \tag{B}$$

As has been mentioned above, the first diffraction grating member 330 is disposed on (adhered to) the second surface 323 of the light guide plate 321, and diffracts/reflects the parallel beams entering the light guide plate 321 through the first surface 322 so that the parallel beams entering the light guide plate 321 undergo total reflections in the inside of the light guide plate 321. Further, as above-mentioned, the second diffraction grating member 340 is disposed on (adhered to) the second surface 323 of the light guide plate 321, and diffracts/reflects a plurality of times the parallel beams propagated through the inside of the light guide plate 321 while undergoing total reflections, so that the parallel beams are emitted from the light guide plate 321 via the first surface 322 as they are parallel beams.

In the light guide plate 321, also, the parallel beams of the three colors of red, green and blue are propagated through the inside of the light guide plate 321 while undergoing total reflections, before being emitted from the light guide plate 321. In this instance, since the light guide plate 321 is thin and the optical path for advancing through the inside of the light guide plate 321 is long, the number of times of total reflection a beam undergoes before reaching the second diffraction grating member 340 differs depending on each angle of view. More in detail, the number of times of reflection for the parallel beams incident on the light guide plate 321 at an angle such as to approach the second diffraction grating member 340, of the parallel beams incident on the light guide plate 321, is smaller than the number of times of reflection for the parallel beams incident on the light guide plate 321 at an angle such as to go away from the second diffraction grating member 340. The reason is as follows. Of the parallel beams diffracted/reflected at the first diffraction grating member 330, the parallel beams incident on the light guide plate 321 at an angle such as to approach the second diffraction grating member 340 are smaller in the angle formed between a beam, propagated through the inside of the light guide plate, and the normal to the light guide plate 321 at the time of impingement of the beam on the inside surface of the light guide plate 321, as compared with the parallel beams incident on the light guide plate 321 at an angle in the reverse direction. In addition, the shape of the interference fringes formed in the inside of the second diffraction grating member 340 and the shape of the interference fringes formed in the inside of the first diffraction grating member 330 are symmetrical with each other about a virtual plane perpendicular to the axis of the light guide plate 321.

Light guide plates 321 in Examples 4 and 6 which will be described later, also, basically have the same configuration or structure as the configuration or structure of the light guide plate 321 described above.

As has been mentioned above, the head mounted display of Example 3 is substantially the same as the head mounted display of Example 1 in configuration or structure, except for the difference as to the optical device 320. Therefore, detailed description of the head mounted display is omitted here.

5. Example 4

Example 4 resides in a modification of Example 3. FIG. 13 shows a conceptual diagram of an image display device in a head mounted display according to Example 4. A light source 251, a collimating optical system 252, a scanning section 253, a relay optical system 254 and the like in the image display device 400 in Example 4 are the same in configuration or structure as those in Example 2. In addition, optical device 320 in Example 4 has the same configuration or structure as that of the optical device 320 in Example 3. Except for these points, the head mounted display of Example 4 is substantially the same as the head mounted display of Example 1 in configuration or structure. Therefore, detailed description of the head mounted display is omitted here.

6. Example 5

Figure 14:
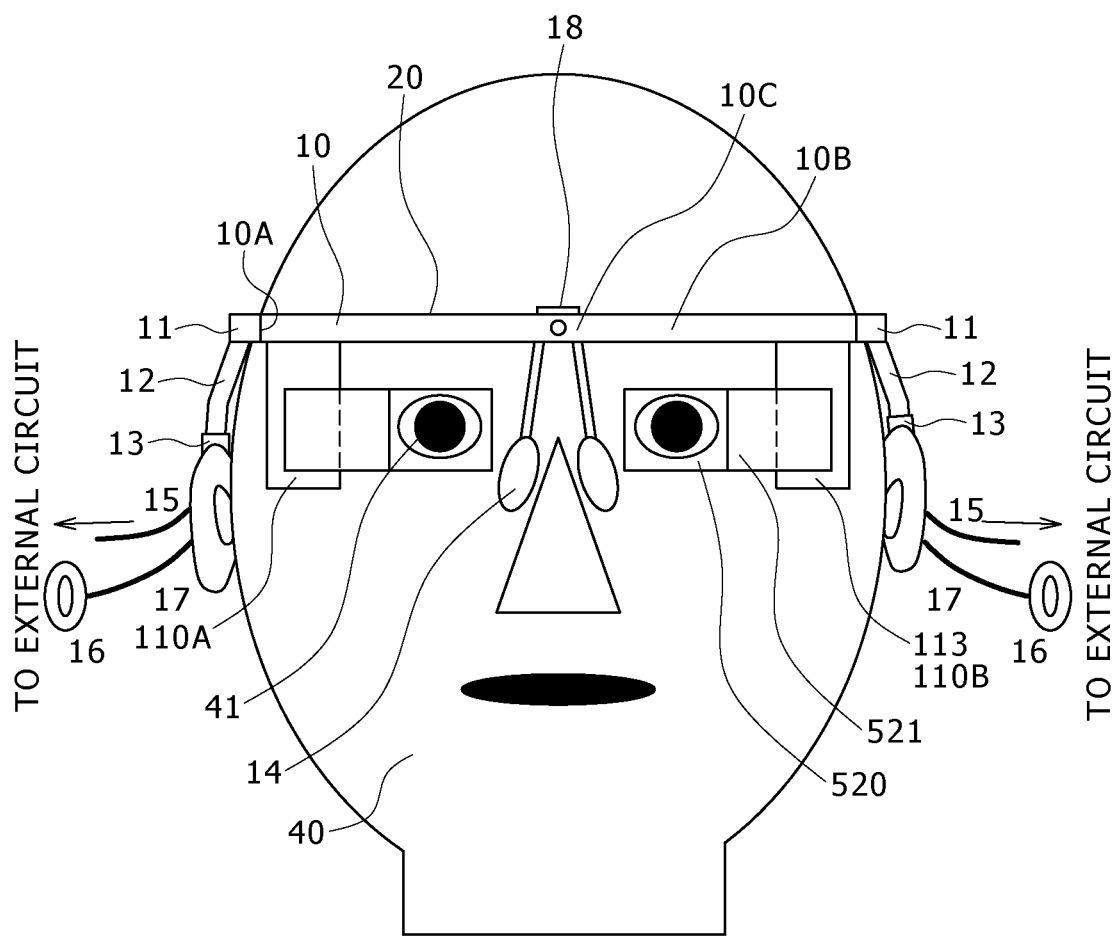
FIG. 14 is a schematic view of a head mounted display according to Example 5 of the invention, as viewed from the front side.
Figure 15:
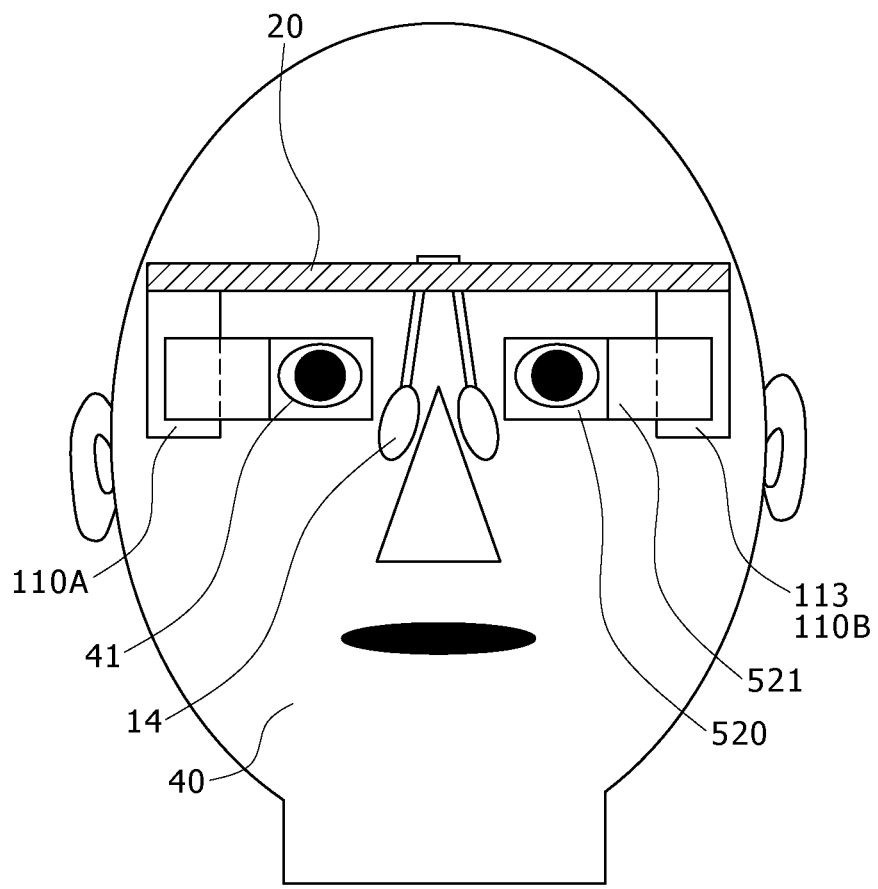
FIG. 15 is a schematic view of the head mounted display according to Example 5 (in an assumed condition where a frame is removed), as viewed from the front side.
Figure 16:
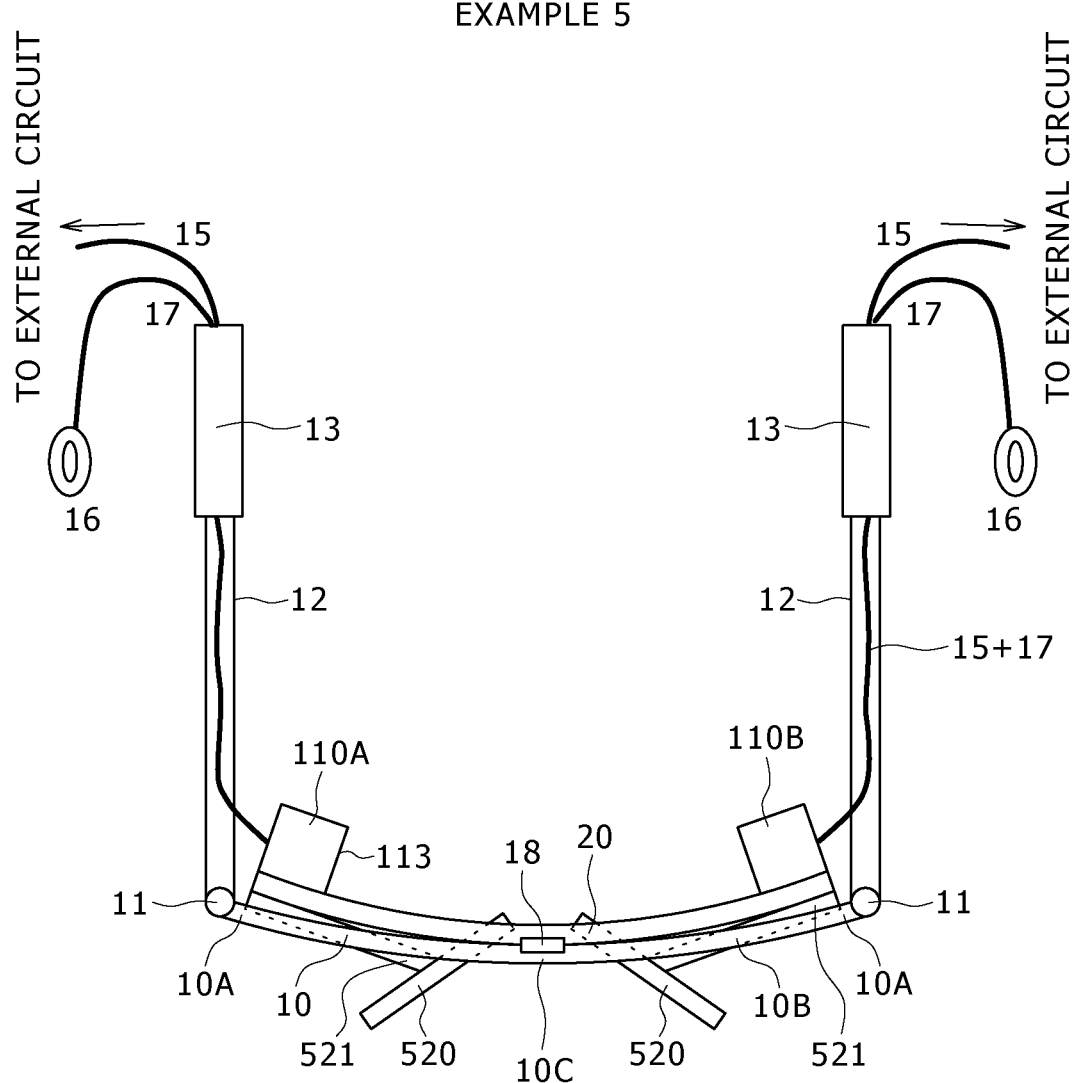
FIG. 16 is a schematic view of the head mounted display according to Example 5, as viewed from the upper side.

Example 5, also, is a modification of Example 1. FIG. 14 shows a schematic view of a head mounted display according to Example 5, as viewed from the front side; and FIG. 15 shows a schematic view of the head mounted display of Example 5 (in an assumed condition where a frame is removed), as viewed from the front side. In addition, FIG. 16 is a schematic view of the head mounted display of Example 5, as viewed from the upper side.

In Example 5, optical device includes semi-transparent mirrors 520 which are located on the side of the center of the face of the observer 40 relative to image generating devices 110A and 110B, on which the beams emitted from the image generating devices 110A and 110B are incident, and from which the beams are emitted toward the pupils 41 of the observer 40. Incidentally, in Example 5, the beams emitted from the image generating devices 110A and 110B are propagated through the inside of transparent members 521 such as glass plates or plastic plates, before being incident on the semi-transparent mirrors 520. However, a structure may be adopted in which these beams are propagated through the air, to be incident on the semi-transparent mirrors 520. Besides, the image generating device may be the image generating device 210 as described in Example 2 above.

The image generating devices 110A and 110B are mounted respectively to both end portions of a connecting member 20 by use of small screws, for example. In addition, the member 521 is mounted to each of the image generating devices 110A and 110B, and the semi-transparent mirror 520 is mounted to the member 521. Except for these points, the head mounted display of Example 5 is substantially the same as the head mounted display of Example 1 in configuration or structure. Therefore, detailed description of the head mounted display is omitted here.

7. Example 6

Figure 17:
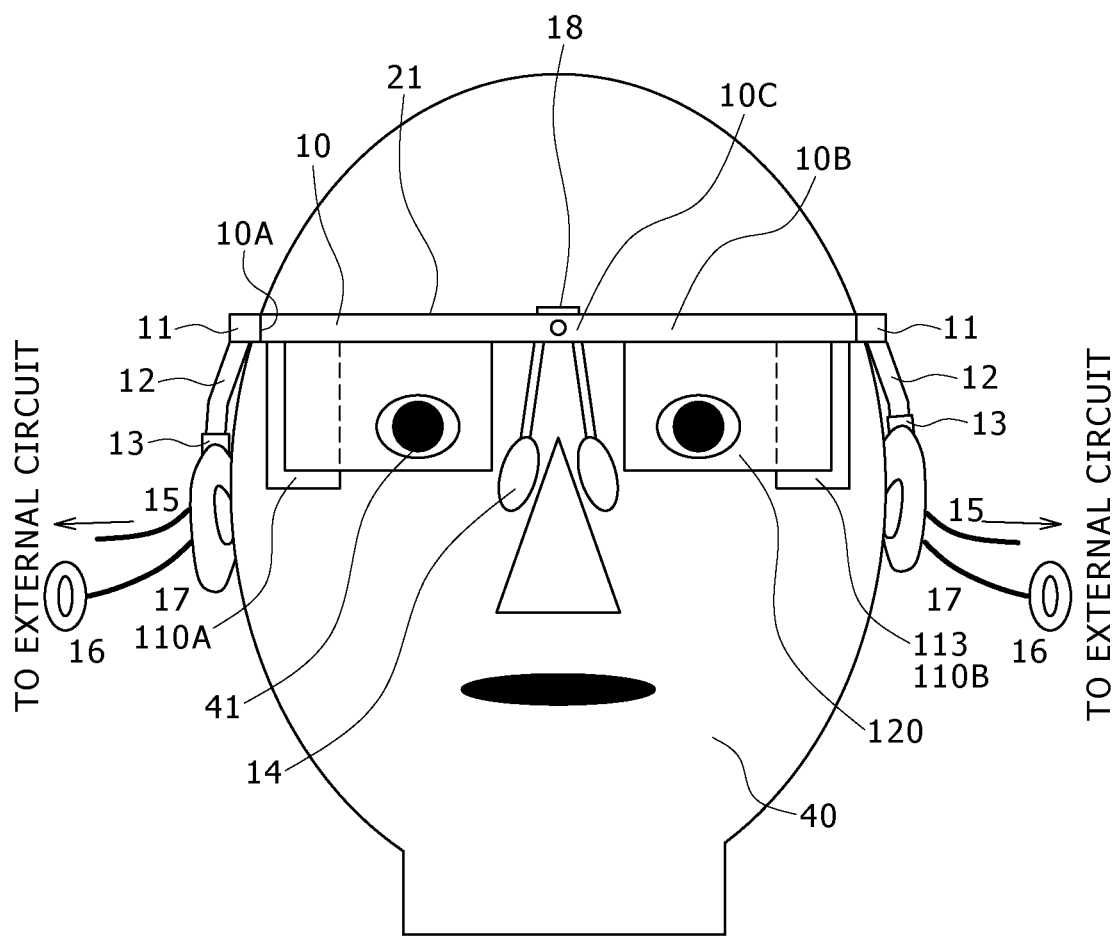
FIG. 17 is a schematic view of a head mounted display according to Example 6, as viewed from the front side.
Figure 18:
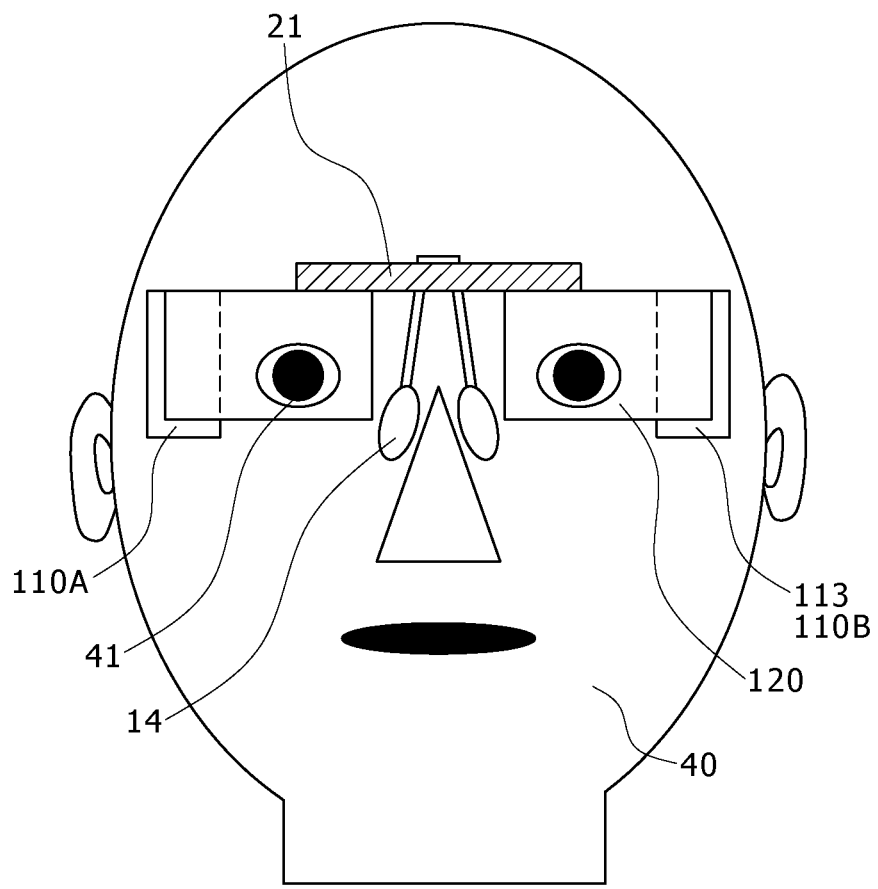
FIG. 18 is a schematic view of the head mounted display according to Example 6 (in an assumed condition where a frame is removed), as viewed from the front side.
Figure 19:
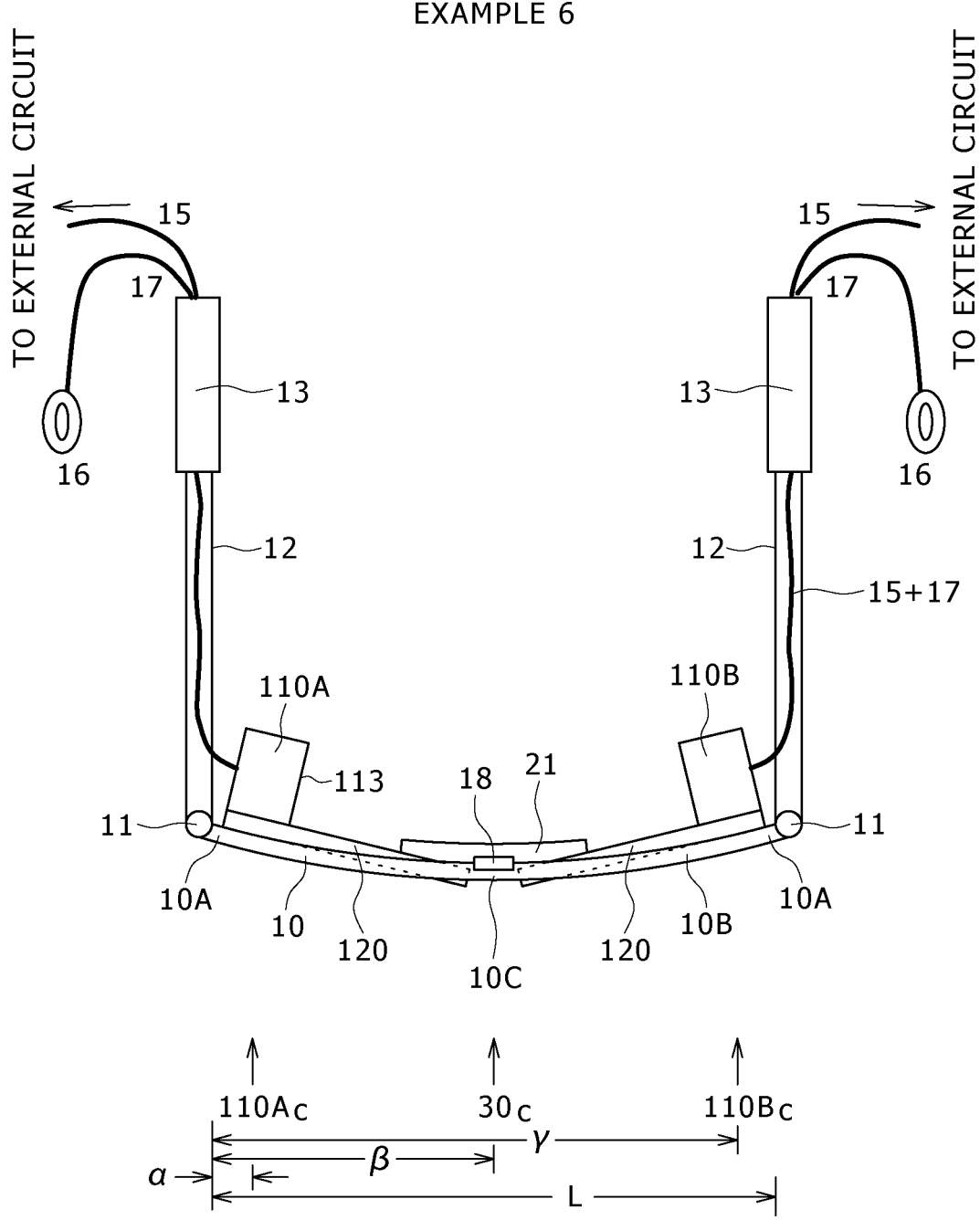
FIG. 19 is a schematic view of the head mounted display according to Example 6, as viewed from the upper side.

Example 6, also, resides in a modification of Example 1. FIG. 17 shows a schematic view of a head mounted display according to Example 6, as viewed from the front side; and FIG. 18 shows a schematic view of the head mounted display (in an assumed condition where a frame is removed) of Example 6, as viewed from the front side. In addition, FIG. 19 shows a schematic view of the head mounted display of Example 6, as viewed from the upper side.

In the head mounted display of Example 6, unlike in Example 1, a bar-like connecting member 21 connects two optical devices 120 to each other, instead of connecting two image generating devices 110A and 110B to each other. Incidentally, another form may also be adopted in which the two optical devices 120 are formed integrally, and the connecting member 21 is mounted to the integrally formed optical devices 120.

Here, in the head mounted display of Example 6, also, the connecting member 21 is mounted to that central portion 10C of a frame 10 which is located between the two pupils 41 of the observer 40 by use of small screws, for example. Each of the image generating devices 110 is located on the outer side relative to the pupil 41 of the observer 40. Incidentally, each of the image generating devices 110 is mounted to an end portion of the optical device 120. A relation $\beta = 0.5 \times L$ is satisfied, where $\beta$ is the distance from the center 21C of the connecting member 21 to one end portion of the frame 10, and L is the length of the frame 10. Incidentally, in Example 6, also, the values of $\alpha'$ and $\gamma'$ are respectively equal to the values of $\alpha$ and $\gamma$ in Example 1.

In Example 6, the frame 10, each image display device 100, the image generating device 110 and the optical device 120 are the same in configuration or structure as the frame 10, the image display device 100, the image generating device 110 and the optical device 120 described in Example 1 above. Therefore, detailed descriptions of these components are omitted here. Besides, except for the above-mentioned points, the head mounted display of Example 6 is substantially the same as the head mounted display of Example 1 in configuration or structure. Therefore, detailed description of the head mounted display is omitted here.

In addition, the configuration or structure in which the bar-like connecting member 21 connects the two optical devices 120, 120 to each other in Example 6 can be applied to the head mounted displays described in Examples 2 to 5 above.

While the present application has been described based on the preferable Examples above, the present application is not to be limited to the Examples. The configurations or structures of the image display device described in Examples above are mere exemplary ones, and they can be modified as required. Besides, while the head mounted display has been described exclusively as being of the binocular type having two image display devices in Examples above, the head mounted display may be of the monocular type having only one image display device.

For example, in the image display device, the light guide plate may be provided with a surface relief hologram (see US Patent No. 20040062505 A1). In the optical device 320 in Example 3 or 4, the diffraction grating element may include a transmission-type diffraction grating element. Or, a configuration may be adopted in which either one of the first deflecting section and the second deflecting section includes a reflection-type diffraction grating element, and the other includes a transmission-type diffraction grating element. Or, further, the diffraction grating element includes a reflection-type blazed diffraction grating element.

Figure 20:
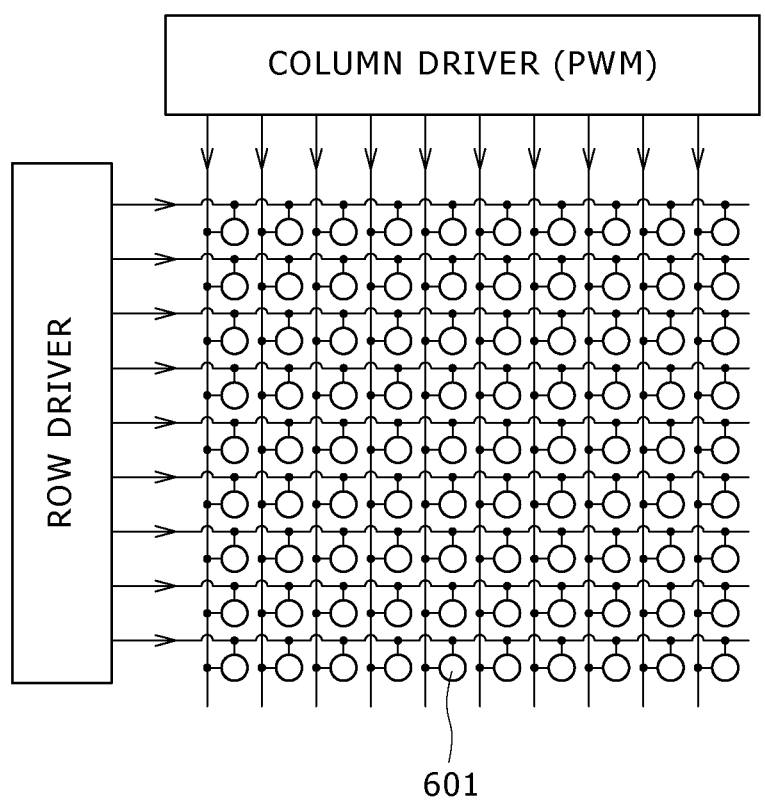
FIG. 20 is a conceptual diagram illustrating a modification of the image forming device, suited to use in Example 1, 3, 5 or 6.

FIG. 20 shows a conceptual diagram of an exemplary modification of the image generating device which can suitably be used in Example 1, 3, 5 or 6. As shown in the figure, there may be adopted an active matrix type image generating device including a light emitting panel in which light emitting elements 601 including semiconductor light emitting elements are arranged in a two-dimensional matrix, and the respective light-emitting/non-light-emitting states of the light emitting elements 601 are controlled, whereby the light-emitting states of the light emitting elements 601 are put to direct observation and, hence, an image is displayed. Beams emitted from this image generating device are led through a collimating optical system 112, to be incident on a light guide plate 121, 321.

Or, there may be adopted an image generating device for color display illustrated by a conceptual diagram in FIG. 21, including:

(α) a red light emitting panel 611R in which red light emitting elements 601R operable to emit red light are arranged in a two-dimensional matrix;

(β) a green light emitting panel 611G in which green light emitting elements 601G operable to emit green light are arranged in a two-dimensional matrix; and (γ) a blue light emitting panel 611B in which blue light emitting elements 601B operable to emit blue light are arranged in a two-dimensional matrix; as well as (δ) a section (for example, dichroic prism 603) configured to collect the beams emitted from the red light emitting panel 611R, the green light emitting panel 611G and the blue light emitting panel 611B into a single optical path;

wherein the respective light-emitting/non-light-emitting states of the red light emitting elements 601R, the green light emitting elements 601G and the blue light emitting elements 601B are controlled. The beams emitted from this image generating device, also, are led through a collimating optical system 112, to be incident on a light guide plate 121, 321. Incidentally, reference numeral 612 denotes a microlens for condensing the beam emitted from the light emitting element.

Or, there may be adopted an image generating device which, as illustrated by a conceptual diagram shown in FIG. 22, includes at least light emitting panels 611R, 611G, 611B having light emitting elements 601R, 601G, 601B arranged in two-dimensional matrix patterns, respectively. In this case, the passages/non-passages of beams emitted from the light emitting panels 611R, 611G, 611B are controlled respectively by light passage controllers 604R, 604G, 604B, and the beams permitted to pass are incident on a dichroic prism 603, by which the optical paths of the beams are collected into a single optical path. The beams in the single optical path are led through a collimating optical system 112, to be incident on a light guide plate 121, 321.

Or, there may be adopted an image generating device which, as illustrated by a conceptual diagram shown in FIG. 23, includes at least light emitting panels 611R, 611G, 611B having light emitting elements 601R, 601G, 601B arranged in two-dimensional matrix patterns, respectively. In this case, beams emitted from the light emitting panels 611R, 611G, 611B are incident on a dichroic prism 603, by which the optical paths of the beams are collected into a single optical path. The passages/non-passages of the beams emitted from the dichroic prism 603 are controlled by a light passage controller 604, and the beams permitted to pass are led through a collimating optical system 112, to be incident on a light guide plate 121, 321.

Or, further, there may be adopted an image generating device as illustrated in FIG. 24. This image generating device includes: a light emitting element 601R operable to emit red light, and a light passage controller (for example, a liquid crystal display device 604R) as a kind of light valve for controlling the passage/non-passage of the light emitted from the light emitting element 601R operable to emit red light; a light emitting element 601G operable to emit green light, and a light passage controller (for example, a liquid crystal display device 604G) as a kind of light valve for controlling the passage/non-passage of the light emitted from the light emitting element 601G operable to emit green light; a light emitting element 601B operable to emit blue light, and a light passage controller (for example, a liquid crystal display device 604B) as a kind of light valve for controlling the passage/non-passage of the light emitted from the light emitting element 601B operable to emit blue light; and a light guiding member 602 for guiding the light beams emitted from the light emitting elements 601R, 601G, 601B including GaN semiconductors, and a section (for example, dichroic prism 603) configured to collect the optical paths of the light beams into a single optical path.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A head mounted display comprising;
at least one processor configured to:
receive image data obtained by an image sensing device sensing a reference object,
control a display to display a reference image having a color that is a different color from a color the reference object based on the image data,
correct the image data according to a first distance between the image sensing device and the reference object and a second distance between the imaging sensing device and an object other than the reference object, and
control the display to display the corrected image data,
wherein the at least one processor is configured to control the display to display guidance information to assist an observer with correcting the image data,
wherein the guidance information includes text that instructs the observer to perform one or more actions, and
wherein the one or more actions are for the observer to actuate one or more control elements of a control panel.

2. The head mounted display of claim 1, wherein the at least one processor is configured to:
receive other data that indicates whether or not the reference object and the reference image are in registration with each other, and
correct the image data based on the other data.

3. The head mounted display of claim 1, wherein the one or more control elements adjust settings that include scaling, rotation, and translation of the reference image.

4. The head mounted display of claim 3, wherein the text instructs the observer to adjust the rotation, the translation, and the scaling of the reference image in that order.

5. The head mounted display of claim 4, wherein the text instructs the observer to store the adjusted settings in a memory.

6. A display device comprising;
a frame;
an image display device;
an image sensing device; and
at least one processor configured to:

receive image data obtained by the image sensing device sensing a reference object, control the image display device to display a reference image having a color that is a different color from a color the reference object based on the image data, correct the image data according to a first distance between the image sensing device and the reference object and a second distance between the image sensing device and an object other than the reference object, and control the image display device to display the corrected image data, wherein the at least one processor is configured to control the image display device to display guidance information to assist an observer with correcting the image data, wherein the guidance information includes text that instructs the observer to perform one or more actions, and wherein the one or more actions are for the observer to actuate one or more control elements of a control panel.

7. The display device of claim 6, wherein the at least one processor is configured to:

receive other data that indicates whether or not the reference object and the reference image are in registration with each other, and correct the image data based on the other data.

8. The display device of claim 6, wherein the one or more control elements adjust settings that include scaling, rotation, and translation of the reference image.

9. The display device of claim 8, wherein the text instructs the observer to adjust the rotation, the translation, and the scaling of the reference image in that order.

10. The display device of claim 9, wherein the text instructs the observer to store the adjusted settings in a memory.

11. A method, comprising:

receiving image data obtained by an image sensing device sensing a reference object;

controlling a display to display a reference image having a color that is a different color from a color the reference object based on the image data;

correcting the image data according to a first distance between the image sensing device and the reference object and a second distance between the imaging sensing device and an object other than the reference object;

controlling the display to display the corrected image data; and controlling the display to display guidance information to assist an observer with correcting the image data, wherein the guidance information includes text that instructs the observer to perform one or more actions, and wherein the one or more actions are for the observer to actuate one or more control elements of a control panel.

* * * * *